(12) United States Patent
Lei et al.

(10) Patent No.: US 10,728,000 B2
(45) Date of Patent: Jul. 28, 2020

(54) REFERENCE SIGNAL TRANSMISSION TECHNIQUES IN WIRELESS COMMUNICATIONS

(71) Applicant: QUALCOMM Incorporated, San Diego, CA (US)

(72) Inventors: Jing Lei, San Diego, CA (US); Seyong Park, San Diego, CA (US); Renqiu Wang, San Diego, CA (US); Jing Jiang, San Diego, CA (US); Joseph Binamira Soriaga, San Diego, CA (US); Tingfang Ji, San Diego, CA (US); Naga Bhushan, San Diego, CA (US); Yi Huang, San Diego, CA (US); Ying Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/238,268

(22) Filed: Jan. 2, 2019

(65) Prior Publication Data
US 2019/0207723 A1    Jul. 4, 2019

Related U.S. Application Data

(60) Provisional application No. 62/613,557, filed on Jan. 4, 2018.

(51) Int. Cl.
*H04L 5/00* (2006.01)
*H04L 27/06* (2006.01)
(Continued)

(52) U.S. Cl.
CPC .......... *H04L 5/005* (2013.01); *H04J 11/0043* (2013.01); *H04J 13/0059* (2013.01);
(Continued)

(58) Field of Classification Search
CPC ..... H04L 5/005; H04L 5/0048; H04L 5/0092; H04L 5/0094; H04L 5/0051; H04L 27/06;
(Continued)

(56) References Cited

U.S. PATENT DOCUMENTS

| 2012/0188988 A1* | 7/2012 | Chung | .................... | H04J 13/00 |
| | | | | 370/335 |
| 2016/0277081 A1 | 9/2016 | Wei et al. | | |

(Continued)

FOREIGN PATENT DOCUMENTS

| EP | 3177096 A1 | 6/2017 | | |
| WO | WO-2008030856 A2 * | 3/2008 | .......... | H04L 1/1887 |
| WO | WO-2017118394 A1 * | 7/2017 | .......... | H04L 5/0048 |

OTHER PUBLICATIONS

Nokia et al. "Remaining issues on UL Transmission without grant", 3GPP Draft R1-1715548, Sep. 17, 2007.*
(Continued)

*Primary Examiner* — Afsar M Qureshi
(74) *Attorney, Agent, or Firm* — Holland & Hart LLP

(57) ABSTRACT

Methods, systems, and devices for wireless communications are described that provide a number of groups of transmitters, each group of transmitters having at least one user equipment (UE), and each group of transmitters having an associated transmission opportunity (TXO) for transmission of a reference signal. A number of UEs may transmit transmissions to a base station according to non-orthogonal multiple access (NOMA) techniques in which two or more UEs concurrently transmit to the base station. Depending upon a number of UEs, a number of groups of transmitters, an overloading factor of NOMA transmissions, a system bandwidth, a time span of the reference signal TXO, or any combination thereof, a binary or non-binary orthogonal cover code (OCC) may be applied to transmitted reference
(Continued)

signals, which the base station may use to identify reference signals from particular UEs.

30 Claims, 22 Drawing Sheets

(51) Int. Cl.
| | | |
|---|---|---|
| *H04L 27/26* | (2006.01) | |
| *H04W 76/28* | (2018.01) | |
| *H04W 76/27* | (2018.01) | |
| *H04J 13/00* | (2011.01) | |
| *H04J 11/00* | (2006.01) | |

(52) U.S. Cl.
CPC ........ *H04J 13/0062* (2013.01); *H04L 5/0048* (2013.01); *H04L 5/0053* (2013.01); *H04L 5/0092* (2013.01); *H04L 5/0094* (2013.01); *H04L 27/06* (2013.01); *H04L 27/261* (2013.01); *H04L 27/2614* (2013.01); *H04W 76/27* (2018.02); *H04W 76/28* (2018.02); *H04L 5/0051* (2013.01)

(58) Field of Classification Search
CPC .. H04L 27/261; H04L 27/2614; H04W 76/27; H04W 76/28; H04J 11/0043; H04J 13/0062
USPC .......................................................... 370/329
See application file for complete search history.

(56) References Cited

U.S. PATENT DOCUMENTS

| | | | |
|---|---|---|---|
| 2018/0337756 A1* | 11/2018 | Nam | ..................... H04L 5/0048 |
| 2019/0074947 A1* | 3/2019 | Zhang | .................. H04L 5/0064 |
| 2019/0173641 A1* | 6/2019 | Liu | ..................... H04W 72/044 |
| 2019/0229962 A1* | 7/2019 | Peng | .................. H04L 27/2613 |
| 2020/0052848 A1* | 2/2020 | Gao | .......................... H04L 1/00 |

OTHER PUBLICATIONS

International Search Report and Written Opinion—PCT/US2019/012134—ISA/EPO—dated Apr. 11, 2019.
Nokia et al., "Remaining Issues on UL Transmission without Grant", 3GPP DRAFT; R1-1715548_Grant-Free_Final, 3rd Generation Partnership Project (3GPP), Mobile Competence Centre; 650, Route Des Lucioles; F-06921 Sophia-Antipolis Cedex ; France vol. RAN WG1, No. Nagoya, Japan; Sep. 18, 2017-Sep. 21, 2017, Sep. 17, 2017, XP051339015, Retrieved from the Internet: URL:http://www.3gpp.org/ftp/Meetings_3GPP_SYNC/RAN1/Docs/ [retrieved on Sep. 17, 2017], Sect. 2, 4 pages.
Samsung: "DRS Design and LBT Procedure", 3GPP DRAFT; R1-154767 DRS Design and LBT Procedure, 3rd Generation Partnership Project (3GPP), Mobile Competence Centre; 650, Route Des Lucioles; F-06921 Sophia-Antipolis Cedex ; France vol. RAN WG1, No. Beijing, China; Aug. 24, 2015-Aug. 28, 2015 Aug. 30, 2015, XP051021041, Retrieved from the Internet: URL:http://www.3gpp.org/ftp/tsg_ran/WG1_RL1/TSGR1_82/Docs/ [retrieved on Aug. 30, 2015], Sect. 2, 7 pages.

* cited by examiner

Ports A1-A3

715

Ports B1-B3

720

Ports C1-C3

725

Ports D1-D3

730

Ports E1-E3

735

Ports F1-F3

740

700

REFERENCE SIGNAL TRANSMISSION TECHNIQUES IN WIRELESS COMMUNICATIONS

CROSS REFERENCES

The present Application for Patent claims the benefit of U.S. Provisional Patent Application No. 62/613,557 by LEI, et al., entitled "REFERENCE SIGNAL TRANSMISSION TECHNIQUES IN WIRELESS COMMUNICATIONS," filed Jan. 4, 2018, assigned to the assignee hereof, and expressly incorporated herein.

BACKGROUND

The following relates generally to wireless communication, and to reference signal transmission techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support reference signal transmission techniques in wireless communications. Generally, the described techniques provide a number of groups of transmitters, each group of transmitters having at least one user equipment (UE), and each group of transmitters having an associated transmission opportunity (TXO) for transmission of a reference signal (e.g., a demodulation reference signal (DMRS)). In some cases, a number of UEs may transmit transmissions to a base station according to non-orthogonal multiple access (NOMA) techniques in which two or more UEs concurrently transmit to the base station. The base station in such cases may use a multi-user decoder (MUD) and successive interference cancellation (SIC) to decode the different transmissions from the different UEs.

In some cases, the base station may use reference signals transmitted in the TXO associated with the different groups of transmitters in order to provide a reliable reference signal for the base station to use for decoding transmissions from multiple UEs. In some cases, depending upon a number of UEs, a number of groups of transmitters, an overloading factor of NOMA transmissions, a system bandwidth, a time span of the reference signal TXO, or any combination thereof, a binary or non-binary orthogonal cover code (OCC) may be applied to transmitted reference signals, which the base station may use to identify reference signals from particular UEs. In some cases, TXOs for different groups of transmitters may be staggered in the time domain and transmitters may enter a discontinuous transmission (DTX) mode until the start of their respective TXO. In some cases, data transmissions may be interlaced with reference signal transmissions within a reference signal TXO. Further, in some cases, transmitters may transmit data transmissions prior to their respective TXO.

A method of wireless communication is described. The method may include identifying a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups, determining a reference signal sequence for a reference signal to be transmitted in the first reference signal TXO, selecting an OCC to be applied to the reference signal sequence, wherein the OCC is selected from a set of available OCCs that includes non-binary OCCs, applying the selected OCC to the reference signal sequence to obtain the reference signal, and transmitting the reference signal during the first reference signal TXO.

An apparatus for wireless communication is described. The apparatus may include means for identifying a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups, means for determining a reference signal sequence for a reference signal to be transmitted in the first reference signal TXO, means for selecting an OCC to be applied to the reference signal sequence, wherein the OCC is selected from a set of available OCCs that includes non-binary OCCs, means for applying the selected OCC to the reference signal sequence to obtain the reference signal, and means for transmitting the reference signal during the first reference signal TXO.

Another apparatus for wireless communication is described. The apparatus may include a processor, memory in electronic communication with the processor, and instructions stored in the memory. The instructions may be operable to cause the processor to identify a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups, determine a reference signal sequence for a reference signal to be transmitted in the first reference signal TXO, select an OCC to be applied to the reference signal sequence, wherein the OCC is selected from a set of available OCCs that includes non-binary OCCs, apply the selected OCC to the reference signal sequence to obtain the reference signal, and transmit the reference signal during the first reference signal TXO.

A non-transitory computer-readable medium for wireless communication is described. The non-transitory computer-readable medium may include instructions operable to cause a processor to identify a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups, determine a reference signal sequence for a reference signal to be transmitted in the first reference signal TXO, select an OCC to be applied to the reference signal sequence, wherein the OCC is selected from a set of available OCCs that includes non-binary OCCs, apply the selected OCC to the reference signal sequence to obtain the reference signal, and transmit the reference signal during the first reference signal TXO.

Some examples of the method, apparatus, and non-transitory computer-readable medium described above may further include processes, features, means, or instructions for determining that the first TXO follows a second reference signal TXO of a second transmitter group of the plurality of transmitter groups within a transmission time interval (TTI). Some examples of the method, apparatus, and non-transitory computer-readable medium described above may further include processes, features, means, or instructions for entering a DTX mode for a portion of the TTI until the start of the first reference signal TXO. Some examples of the method, apparatus, and non-transitory computer-readable medium described above may further include processes, features, means, or instructions for determining that a third transmitter group of the plurality of transmitter groups may have a third reference signal TXO that starts after the second TXO within the TTI. Some examples of the method, apparatus, and non-transitory computer-readable medium described above may further include processes, features, means, or instructions for transmitting a data transmission concurrently with one or more reference signal transmissions of one or more transmitters of the third transmitter group. In some examples of the method, apparatus, and non-transitory computer-readable medium described above, one or more resource elements (REs) for the data transmission may be selected to be different than reference signal REs of the one or more reference signal transmissions of the one or more transmitters of the third transmitter group.

Some examples of the method, apparatus, and non-transitory computer-readable medium described above may further include processes, features, means, or instructions for transmitting, after transmitting the reference signal, one or more data transmissions, and wherein a first transmit power used for the reference signal may be different than a second transmit power used for the one or more data transmissions.

In some examples of the method, apparatus, and non-transitory computer-readable medium described above, the reference signal sequence may be determined independently of the reference signal TXO. In some examples of the method, apparatus, and non-transitory computer-readable medium described above, the reference signal TXO comprises one or more orthogonal frequency division multiplexing (OFDM) symbols.

In some examples of the method, apparatus, and non-transitory computer-readable medium described above, the first reference signal TXO may be directly adjacent to one or more other reference signal TXOs of one or more other of the plurality of transmitter groups, or one or more OFDM symbols separate the first reference signal TXO and a prior or subsequent reference signal TXO of one or more other of the plurality of transmitter groups. In some examples of the method, apparatus, and non-transitory computer-readable medium described above, the reference signal TXO resources may be dynamically configured via a physical downlink control channel (PDCCH) transmission from a base station, or may be semi-statically configured via radio resource control (RRC) signaling from the base station.

Some examples of the method, apparatus, and non-transitory computer-readable medium described above may further include processes, features, means, or instructions for determining one or more data transmissions that are to be transmitted during the first reference signal TXO. Some examples of the method, apparatus, and non-transitory computer-readable medium described above may further include processes, features, means, or instructions for interlacing the one or more data transmissions with the reference signal. Some examples of the method, apparatus, and non-transitory computer-readable medium described above may further include processes, features, means, or instructions for transmitting the one or more data transmissions interlaced with the reference signal during the first reference signal TXO. In some examples of the method, apparatus, and non-transitory computer-readable medium described above, the reference signal may be transmitted using a same transmit power as the one or more data transmissions.

In some examples of the method, apparatus, and non-transitory computer-readable medium described above, the selecting comprises selecting a binary OCC or a non-binary OCC based at least in part on an overloading factor of NOMA transmissions, a system bandwidth, a time span of the first reference signal TXO, or any combination thereof. In some examples of the method, apparatus, and non-transitory computer-readable medium described above, the non-binary OCC sequence comprises a constant amplitude zero autocorrelation (CAZAC) waveform, a discrete Fourier transform (DFT) sequence, or a computer generated sequence (CGS) with a low peak to average power ratio (PAPR). In some examples of the method, apparatus, and non-transitory computer-readable medium described above, the CAZAC waveform may be a Zadoff-Chu Sequence with a same root and different cyclic shift.

Some examples of the method, apparatus, and non-transitory computer-readable medium described above may further include processes, features, means, or instructions for transmitting a first data transmission prior to the first reference signal TXO and concurrently with a second reference signal TXO of a second transmitter group of the plurality of transmitter groups. In some examples of the method, apparatus, and non-transitory computer-readable medium described above, one or more REs used for the data transmission may be different than REs used for reference signal transmissions by one or more transmitters of the second transmitter group during the second reference signal TXO. In some examples of the method, apparatus, and non-transitory computer-readable medium described above, a first transmit power used for the data transmission prior to the first reference signal TXO may be different than a second transmit power used for the reference signal transmission during the first reference signal TXO.

Some examples of the method, apparatus, and non-transitory computer-readable medium described above may further include processes, features, means, or instructions for transmitting a portion of a first data transmission after the first reference signal TXO and concurrently with a second reference signal TXO of a second transmitter group of the plurality of transmitter groups. Some examples of the method, apparatus, and non-transitory computer-readable medium described above may further include processes, features, means, or instructions for determining that a portion of a second data transmission is to be transmitted during the first reference signal TXO. Some examples of the method, apparatus, and non-transitory computer-readable medium described above may further include processes, features, means, or instructions for interlacing the portion of the second data transmission with the reference signal. Some examples of the method, apparatus, and non-transitory computer-readable medium described above may further include processes, features, means, or instructions for transmitting the portion of the second data transmission interlaced with the reference signal during the first reference signal TXO.

In some examples of the method, apparatus, and non-transitory computer-readable medium described above, the reference signal of the first transmitter group may be transmitted using a same transmit power as the first data transmission of a first transmitter group on the first reference signal TXO, and wherein the first data transmission may be transmitted using a different transmit power than the reference signal when the first data transmission is not transmitted on the first reference signal TXO, and wherein the transmit power of the reference signal and the first data transmission may be different from the transmit power of the second reference signal and the second data transmission.

A method of wireless communication is described. The method may include configuring a plurality of transmitter groups each having a plurality of transmitters and an associated reference signal TXO for reference signal transmissions, wherein each reference signal TXO is non-overlapping with other reference signal TXOs of other transmitter groups, receiving a plurality of reference signals from one or more transmitters within each of the plurality of transmitter groups, at least a first reference signal of a first transmitter in a first transmitter group received concurrently with a data transmission of a second transmitter in a second transmitter group, and determining a decoding order for a SIC procedure to be used for decoding subsequent transmissions of the first transmitter and the second transmitter based at least in part on the plurality of reference signals.

An apparatus for wireless communication is described. The apparatus may include means for configuring a plurality of transmitter groups each having a plurality of transmitters and an associated reference signal TXO for reference signal transmissions, wherein each reference signal TXO is non-overlapping with other reference signal TXOs of other transmitter groups, means for receiving a plurality of reference signals from one or more transmitters within each of the plurality of transmitter groups, at least a first reference signal of a first transmitter in a first transmitter group received concurrently with a data transmission of a second transmitter in a second transmitter group, and means for determining a decoding order for a SIC procedure to be used for decoding subsequent transmissions of the first transmitter and the second transmitter based at least in part on the plurality of reference signals.

Another apparatus for wireless communication is described. The apparatus may include a processor, memory in electronic communication with the processor, and instructions stored in the memory. The instructions may be operable to cause the processor to configure a plurality of transmitter groups each having a plurality of transmitters and an associated reference signal TXO for reference signal transmissions, wherein each reference signal TXO is non-overlapping with other reference signal TXOs of other transmitter groups, receive a plurality of reference signals from one or more transmitters within each of the plurality of transmitter groups, at least a first reference signal of a first transmitter in a first transmitter group received concurrently with a data transmission of a second transmitter in a second transmitter group, and determine a decoding order for a SIC procedure to be used for decoding subsequent transmissions of the first transmitter and the second transmitter based at least in part on the plurality of reference signals.

A non-transitory computer-readable medium for wireless communication is described. The non-transitory computer-readable medium may include instructions operable to cause a processor to configure a plurality of transmitter groups each having a plurality of transmitters and an associated reference signal TXO for reference signal transmissions, wherein each reference signal TXO is non-overlapping with other reference signal TXOs of other transmitter groups, receive a plurality of reference signals from one or more transmitters within each of the plurality of transmitter groups, at least a first reference signal of a first transmitter in a first transmitter group received concurrently with a data transmission of a second transmitter in a second transmitter group, and determine a decoding order for a SIC procedure to be used for decoding subsequent transmissions of the first transmitter and the second transmitter based at least in part on the plurality of reference signals.

In some examples of the method, apparatus, and non-transitory computer-readable medium described above, the decoding order may be based at least in part on an order in which the plurality of transmitter groups transmit reference signals, a power of the reference signal transmissions, a channel quality associated with each transmitter group of the plurality of transmitter groups, or any combination thereof.

In some examples of the method, apparatus, and non-transitory computer-readable medium described above, the configuring comprises configuring each transmitter group with TXO resources and an OCC to be applied to the reference signal transmissions, the OCC selected from a set of available OCCs that includes non-binary OCCs.

In some examples of the method, apparatus, and non-transitory computer-readable medium described above, the non-binary OCC sequence comprises a CAZAC waveform, a DFT sequence, or a CGS. In some examples of the method, apparatus, and non-transitory computer-readable medium described above, each reference signal TXO comprises one or more OFDM symbols.

In some examples of the method, apparatus, and non-transitory computer-readable medium described above, a first reference signal TXO of a first transmitter group may be directly adjacent to one or more other reference signal TXOs of one or more other of the plurality of transmitter groups, or one or more OFDM symbols separate the first reference signal TXO and a prior or subsequent reference signal TXO of one or more other of the plurality of transmitter groups. In some examples of the method, apparatus, and non-transitory computer-readable medium described above, the reference signal TXO resources may be dynamically configured via a PDCCH transmission, or may be semi-statically configured via RRC signaling.

In some examples of the method, apparatus, and non-transitory computer-readable medium described above, the configuring comprises configuring transmitters of each transmitter group to enter a DTX mode for a portion of a TTI until the start of the reference signal TXO associated with the respective transmitter group. In some examples of the method, apparatus, and non-transitory computer-readable medium described above, the configuring comprises configuring one or more data transmissions to be transmitted during the reference signal TXOs through interlacing the one or more data transmissions with the reference signal transmissions within the reference signal TXO.

In some examples of the method, apparatus, and non-transitory computer-readable medium described above, the configuring comprises configuring transmitters of one or more of the transmitter groups to transmit a data transmission prior to a corresponding reference signal TXO and concurrently with a reference signal TXO of another transmitter group of the plurality of transmitter groups. In some examples of the method, apparatus, and non-transitory computer-readable medium described above, the configuring comprises configuring transmitters of the one or more transmitter groups to interlace a portion of data transmissions with reference signal transmissions within their respective reference signal TXOs, and configuring at least a first transmitter group to time division multiplex a corresponding first reference signal TXO with other data transmissions of the first transmitter group.

DETAILED DESCRIPTION

Figure 1:
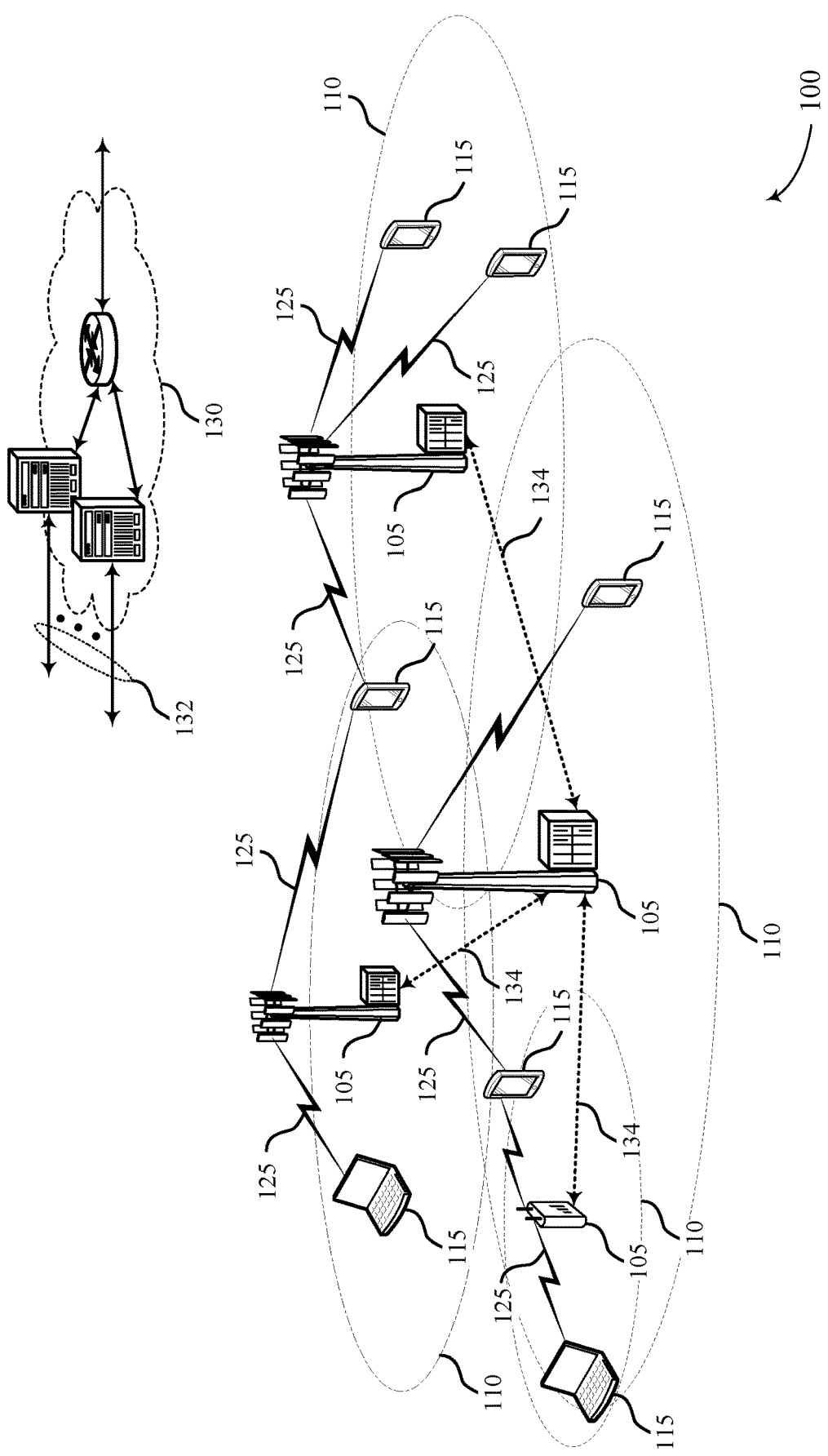
FIG. 1 illustrates an example of a system for wireless communication that supports reference signal transmission techniques in wireless communications in accordance with aspects of the present disclosure.

Some wireless communications systems may support multiple access techniques for multiple users by sharing available system resources (e.g., time, frequency, and power). In some cases, non-orthogonal multiple access (NOMA) techniques may outperform orthogonal multiple access (OMA) techniques, and may allow multiple different transmitters to transmit concurrent transmissions. NOMA techniques may enable access to more system bandwidth for transmitting devices (e.g., a user equipment (UE)), while simultaneously enabling a greater number of users to communicate on a set of time frequency resources. As an example, using OMA techniques, a resource block (RB) may be allocated to three UEs such that, if each UE transmits using a single transmission antenna, three receive antennas may be used at a receiver (e.g., a base station), which may be representative of a 1×3 single-input, multiple-output (SIMO) transmission. By contrast, NOMA techniques may enable multiple UEs to concurrently transmit using the same RB resources.

NOMA's techniques that enable the recovery of multiple simultaneous transmissions include, for example, successive interference cancelation (SIC), multi-user decoders (MUDs), resource spread multiple access (RSMA), or combinations thereof. A MUD may use SIC techniques to decode a first, relatively strong, signal from a first transmitter, subtract the first signal from the received signal, decode a second signal from a second transmitter, and so on. RSMA techniques may utilize lower rate channel coding that spreads a transmitted signal across resources. Gains obtained from the channel coding may lead to robust transmissions, and also may be well suited for sporadic transmissions of small non-orthogonal data bursts. For example, RSMA techniques may be particularly beneficial in systems that support machine type communication (MTC), enhanced MTC (eMTC), narrowband Internet of Things (NB-IoT) communications, and the like. In such cases, signals from multiple transmitting devices may be recovered simultaneously, even in the presence of mutual interference.

As described herein, through the use of NOMA techniques, greater scheduling flexibility may be provided for multiple access by a large number of UEs, while also supporting robust communications with varying channel code rates. Various of the NOMA techniques may rely on decoding of reference signal transmissions from different UEs. In some examples, UEs may transmit a reference signal (e.g., a demodulation reference signal (DMRS)) with the repetitions of uplink data, where respective reference signals may be transmitted in different transmission opportunities (TXOs) for different groups of UEs. Furthermore, in order to provide capabilities for multiple UEs to transmit to a base station concurrently using the same resources, orthogonal cover codes (OCCs) may be applied to transmissions of different UEs. In some cases, the OCCs may be selected from a set of available OCCs that include both binary OCCs and non-binary OCCs. A non-binary OCC is an OCC that provides a number of cover codes that is different than a power of 2 (e.g., 6 cover codes), and a binary OCC provides a number of cover codes that is a power of 2 (e.g., 2 or 4 cover codes). Such techniques may provide additional flexibility to schedule additional UEs for NOMA transmissions and may help enhance the efficient use of available wireless resources.

In some cases, depending upon a number of UEs, a number of groups of transmitters, an overloading factor of NOMA transmissions, a system bandwidth, a time span of the reference signal TXO, or any combination thereof, a binary or non-binary OCC may be applied to transmitted reference signals, which the base station may use to identify reference signals from particular UEs. In some cases, TXOs for different groups of transmitters may be staggered in the time domain and transmitters may enter a discontinuous transmission (DTX) mode until the start of their respective TXO. In some cases, data transmissions may be interlaced with reference signal transmissions within a reference signal TXO. Additionally, or alternatively, transmitters may transmit data transmissions prior to their respective TXO and concurrently with a TXO of a transmitter of another transmitter group.

Aspects of the disclosure are initially described in the context of a wireless communications system. Various examples of TXOs and reference signal transmission resources are described that illustrate several reference signal transmission techniques in accordance with the disclosure. Aspects of the disclosure are further illustrated by and described with reference to apparatus diagrams, system diagrams, and flowcharts that relate to reference signal transmission techniques in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may use NOMA techniques for transmissions, and transmit associated reference signals in accordance with various techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support the concurrent transmissions of multiple transmitters through the use of various NOMA techniques. For example, a MUD at a base station 105 may use SIC to decode signals from multiple UEs 115 that are concurrently transmitted. Further, when transmitting a data stream, a UE 115 may apply different RSMA techniques to enhance reception at the base station 105. UEs 115 may transmit reference signals (e.g., DMRS transmissions) that may assist a base station 105 in receiving signals of the UEs 115. In some cases, depending upon a number of UEs 115, a number of groups of transmitters, an overloading factor of NOMA transmissions, a system bandwidth, a time span of the reference signal TXO, or any combination thereof, a binary or non-binary OCC may be applied to transmitted reference signals, which a base station 105 may use to identify reference signals from particular UEs 115. In some cases, TXOs for different groups of transmitters may be staggered in the time domain and transmitters may enter a DTX mode until the start of their respective TXO. In some cases, data transmissions may be interlaced with reference signal transmissions within a reference signal TXO. Additionally, or alternatively, transmitters may transmit data transmissions prior to their respective TXO and concurrently with a TXO of a transmitter of another transmitter group.

Figure 2:
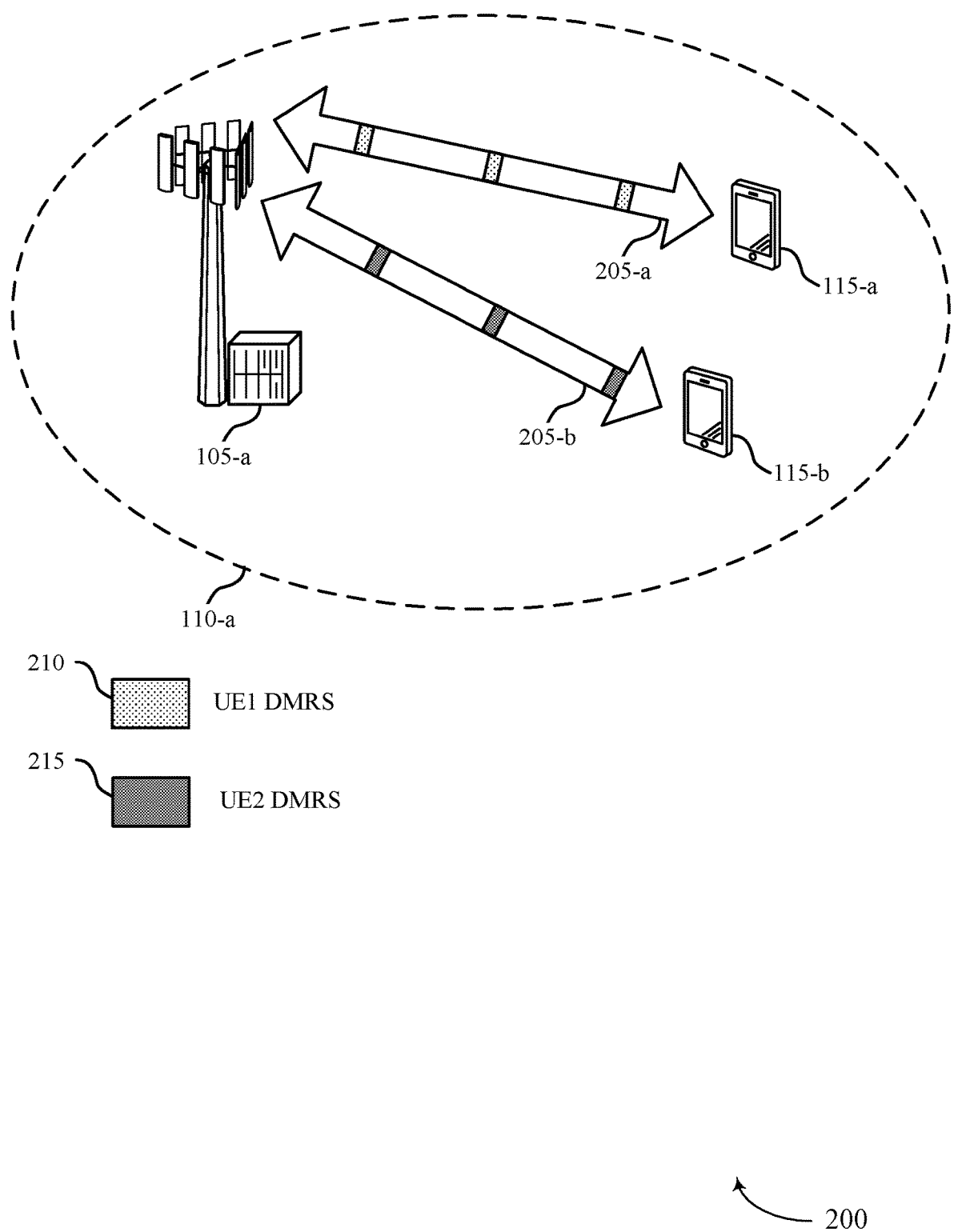
FIG. 2 illustrates an example of a portion of a wireless communication system that supports reference signal transmission techniques in wireless communications in accordance with aspects of the present disclosure.

FIG. 2 illustrates an example of a portion of a wireless communication system 200 that supports reference signal transmission techniques in wireless communications in accordance with various aspects of the present disclosure. In some examples, wireless communication system 200 may implement aspects of wireless communication system 100. In the example of FIG. 2, the wireless communication system 200 may include a base station 105-a, which may be an example of a base station 105 of FIG. 1. The wireless communication system 200 may also include a first UE 115-a and a second UE 115-b, which may be examples of a UE 115 of FIG. 1, that is located within coverage area 110-a of the base station 105-a.

In the example of FIG. 2, the base station 105-a and the first UE 115-a may establish a first connection 205-a and the base station 105-a and the second UE 115-b may establish a second connection 205-b. In some cases, each of the first UE 115-a and the second UE 115-b may concurrently transmit uplink transmissions via their respective connections 205 in accordance with NOMA techniques. As discussed above, NOMA techniques may help to enhance the achievable spectral efficiency (SE) of the wireless communication system 200. In some cases, the base station 105-a may include a SIC/MUD receiver that may receive and decode concurrently transmitted signals transmitted from the first UE 115-a and the second UE 115-b. In various aspects of the present disclosure, the first UE 115-a may transmit a first DMRS 210 (or other reference signal) and the second UE 115-b may transmit a second DMRS 215. In some cases, the first DMRS 210 may be transmitted in a first TXO and the second DMRS 215 may be transmitted in a second TXO that is staggered in the time domain relative to the first TXO.

The first DMRS 210 and second DMRS 215 may have a design that helps to enhance the SE of wireless communication system 200 and help to reduce the complexity of a NOMA receiver at the base station 105-a. The DMRS transmissions occupy time/frequency resources within a respective TXO of the UE 115 that transmits the DMRS transmission, and provides channel estimation for decoding and interference cancellation at the base station 105-a. In some cases, both orthogonal and non-orthogonal designs can be applied to DMRS, DMRS can be multiplexed with NOMA data in time and/or frequency domain, and DMRS transmission can be synchronized or asynchronous. In some cases, time domain staggering of TXOs may help to simplify the implementation of a MUD/SIC receiver at the base station 105-a. Furthermore, various techniques discussed herein provide a number of options for orthogonalized DMRS transmissions, which may enhance the reliability of channel estimation at the base station 105-a. Additionally, or alternatively, various non-binary OCC options provided herein may help to improve capacity of DMRS multiplexing.

Figure 3:
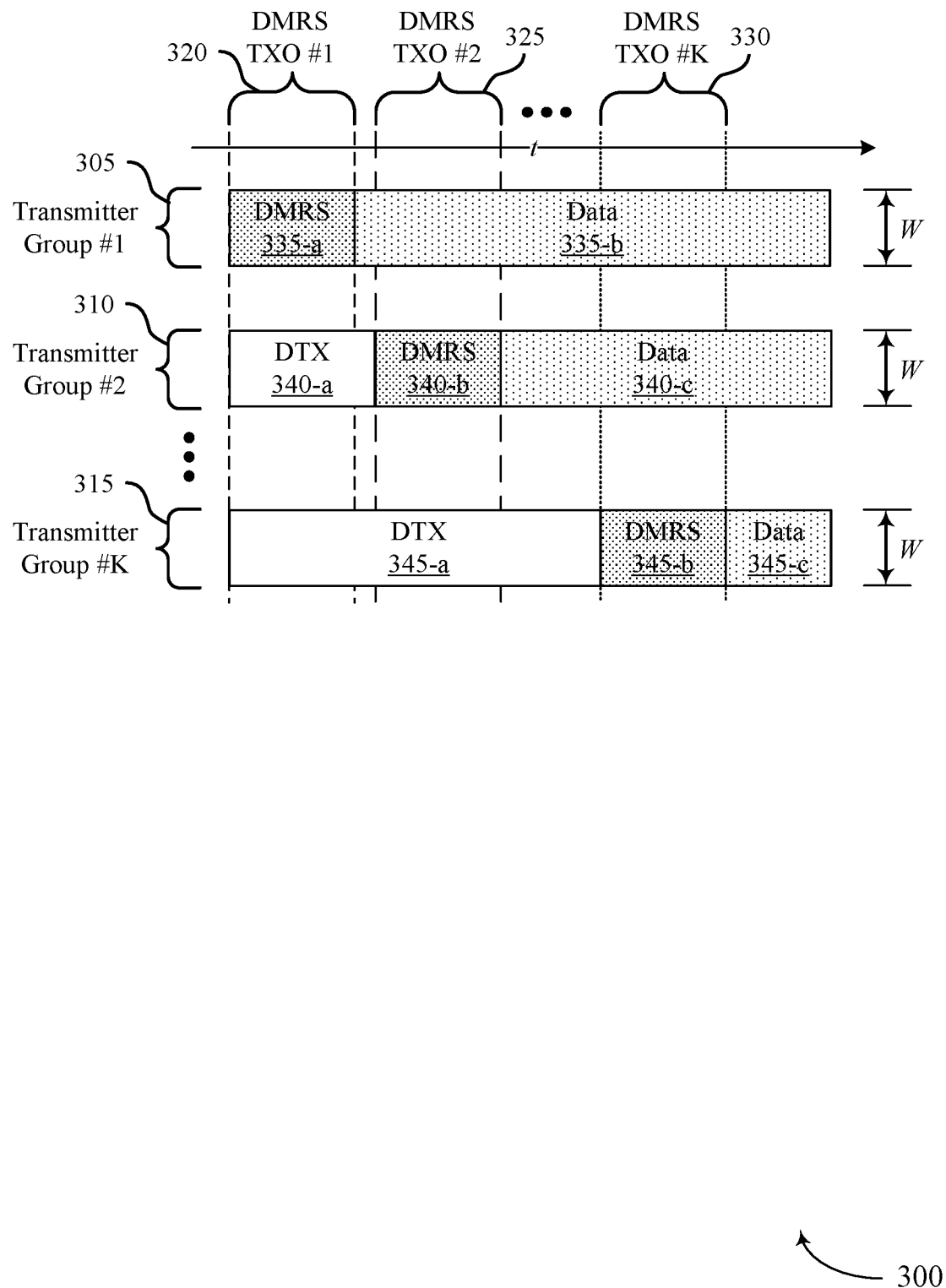
FIG. 3 illustrates an example of wireless resources and different transmitter groups that have associated transmission opportunities (TXOs) that support reference signal transmission techniques in wireless communications in accordance with aspects of the present disclosure.

FIG. 3 illustrates an example of wireless resources 300 and different transmitter groups that have associated transmission opportunities (TXOs) that support reference signal transmission techniques in wireless communications in accordance with various aspects of the present disclosure. In some examples, wireless resources 300 may be used to implement aspects of wireless communication system 100. In the example of FIG. 3, a number of UEs may be partitioned into a number of transmitter groups. In this example, a first transmitter group 305, a second transmitter group 310, and a $K^{th}$ transmitter group 315 are illustrated, each of which may include a number of UEs. Each transmitter group 305-315 has an associated TXO, and in this example the first transmitter group 305 has an associated first TXO 320, the second transmitter group 310 has an associated second TXO 325, and K$^{th}$ transmitter group 315 has an associated K$^{th}$ TXO 330. Thus, if N UEs are present, the N UEs may be partitioned into K non-overlapping groups, and K DMRS TXOs may be configured within a NOMA slot.

In the example of FIG. 3, DMRS transmissions are front-loaded for transmissions of UEs in the different transmission groups 305-315, and are staggered in the time domain. Each transmission group 305-315 may use a same frequency band W for transmissions. In some cases, the staggered TXOs 320-330 may be continuous (i.e., consecutive TXOs occupy adjacent time resources) or non-continuous (i.e., a gap in time may be present between consecutive TXOs). A DMRS transmission for a k$^{th}$ transmitter group (where 1≤k<K) is sent on TXO #k. In the example of FIG. 3, UEs of a transmitter group 305-315 may go into a DTX mode until the start of the associated DMRS TXO 320-330 for the particular transmitter group 305-315. Thus, in this example, UEs of the first transmitter group 305 may transmit first DMRS transmissions 335-a in the first DMRS TXO 320, followed by first data transmissions 335-b. UEs of the second transmitter group 310 may enter a DTX mode 340-a before transmitting second DMRS transmissions 340-b in the second DMRS TXO 325, followed by second data transmissions 340-c. Such a pattern continues until UEs of transmitter group K 315 may enter a DTX mode 345-a before transmitting K$^{th}$ DMRS transmissions 345-b in the K$^{th}$ DMRS TXO 330, followed by K$^{th}$ data transmissions 345-c. Thus, in this example, DMRS transmissions from transmission group k' can avoid data transmissions belonging to group k, where 1≤k<k'. In other examples, as will be discussed in more detail below, DMRS transmissions may collide with data transmissions of other transmission groups. In some cases, a UE can apply different transmission power to DMRS and data transmissions.

A base station that receives the DMRS transmissions may determine a decoding order for a SIC procedure to be used for decoding transmissions of the N UEs based on the order of the DMRS TXOs 320-330. In some cases, the base station may select UEs to be placed into different transmission groups 305-315 based on one or more parameters associated with the UEs. For example, UEs having relatively good channel quality may be partitioned into transmission groups 305-315 having earlier DMRS TXOs 320-330, which may provide enhanced cancellation reliability of the transmissions of such UEs. In the example of FIG. 3, DMRS transmissions are transmitted alone within DMRS TXOs 320-330, but in other examples data transmissions may be interlaced with DMRS transmissions, such as in the example of FIG. 4. In some cases, the DMRS TXOs 320-330 may be dynamically configured via a physical downlink control channel (PDCCH) transmission from the base station, or may be semi-statically configured via RRC signaling from the base station.

Figure 4:
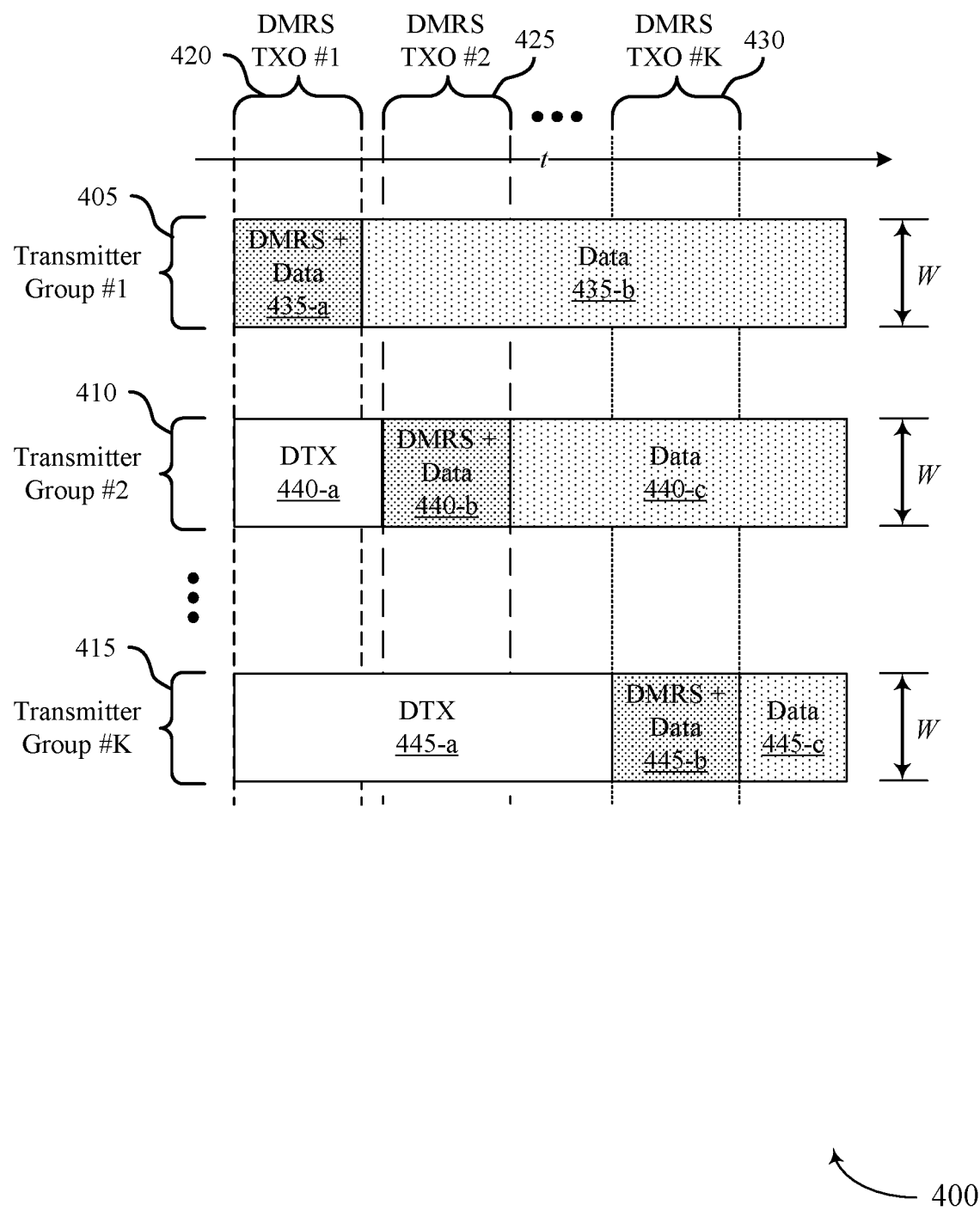
FIG. 4 illustrates another example of wireless resources and different transmitter groups that have associated TXOs that support reference signal transmission techniques in wireless communications in accordance with aspects of the present disclosure.

FIG. 4 illustrates an example of wireless resources 400 and different transmitter groups that have associated TXOs that support reference signal transmission techniques in wireless communications in accordance with various aspects of the present disclosure. In some examples, wireless resources 400 may be used to implement aspects of wireless communication system 100. In the example of FIG. 4, similarly as discussed with respect to FIG. 3, a number of UEs may be partitioned into a number of transmitter groups. In this example, a first transmitter group 405, a second transmitter group 410, and a K$^{th}$ transmitter group 415 are illustrated, each of which may include a number of UEs. Each transmitter group 405-415 has an associated TXO, and in this example the first transmitter group 405 has an associated first TXO 420, the second transmitter group 410 has an associated second TXO 425, and K$^{th}$ transmitter group 415 has an associated K$^{th}$ TXO 430.

In the example of FIG. 4, DMRS transmissions are front-loaded for transmissions of UEs in the different transmission groups 405-415, and are staggered in the time domain similarly as discussed with respect to FIG. 3. In this example, however, DMRS transmission for transmitter group K 415 is interlaced with data of transmitter group K 415 in the frequency domain and transmitted on DMRS TXO #K 430. In such a manner, data and DMRS may be transmitted in 445-b, and the frequency division interlacing provides that there is no intra-group collision between DMRS and data. In some examples, UEs of transmitter group K 415 may apply a same transmission power to DMRS and data transmissions on DMRS TXO #K 430. In some examples, inter-group multiplexing of DMRS and data may be provided in which DMRS transmissions of group K' can collide with data transmissions of a different group K, where 1≤K<K'. In other examples, DMRS transmissions of group K' can avoid data transmission resources belonging to a different group K, where 1≤K<K'.

Figure 5A:
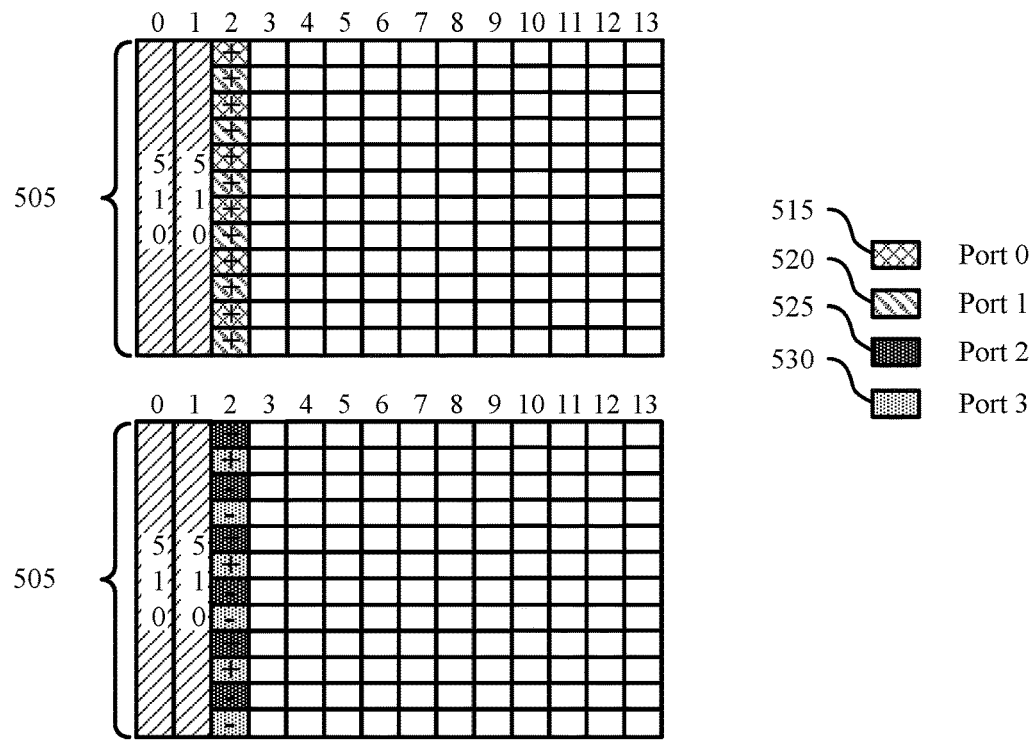
FIGS. 5A and 5B illustrate examples of reference signal resources for different antenna ports that support reference signal transmission techniques in wireless communications in accordance with aspects of the present disclosure.
Figure 5B:
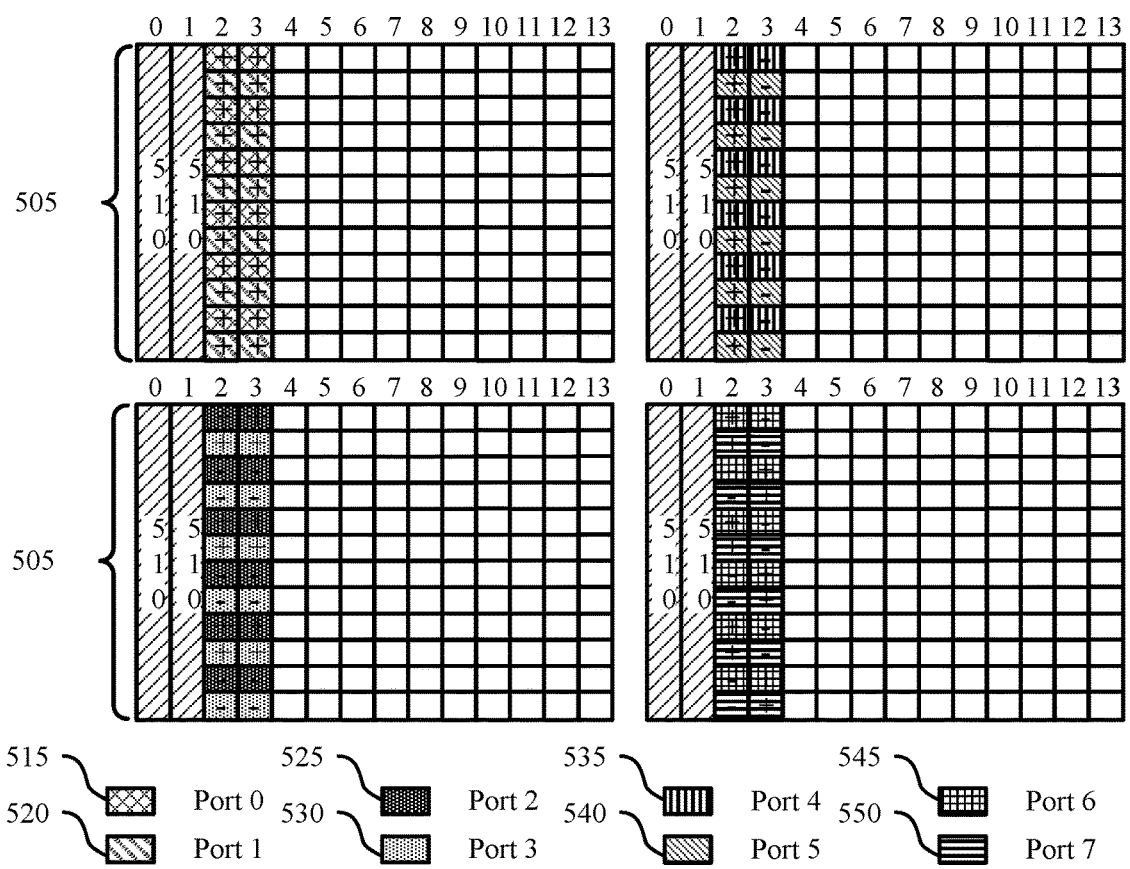

FIGS. 5A and 5B illustrate examples of reference signal resources 500 for different antenna ports that support reference signal transmission techniques in wireless communications in accordance with various aspects of the present disclosure. In some examples, reference signal resources 500 may be used to implement aspects of wireless communication system 100. In some cases, reference signal transmissions within a TXO may be transmitted using a configurable OCC pattern and resource allocations.

In some cases, a single symbol may be allocated for DMRS transmissions, such as illustrated in FIG. 5A. In this example, wireless resources 505 may have two control symbols 510, followed by a DMRS symbol. In cases where one OFDM symbol is allocated for DMRS transmissions, a one-symbol comb structure with frequency division OCC may be used, as illustrated in FIG. 5A, which may provide up to four antenna ports, namely port 0 515, port 1 520, port 2 525, and port 3 530, and thus up to four UEs may concurrently transmit in such a configuration.

In the example, of FIG. 5B, two OFDM symbols may be allocated for DMRS transmissions, and a greater than one symbol comb structure may be used with time division and/or frequency division OCC, as illustrated in FIG. 5B, which may provide up to eight antenna ports 515 through 550.

Figure 6A:
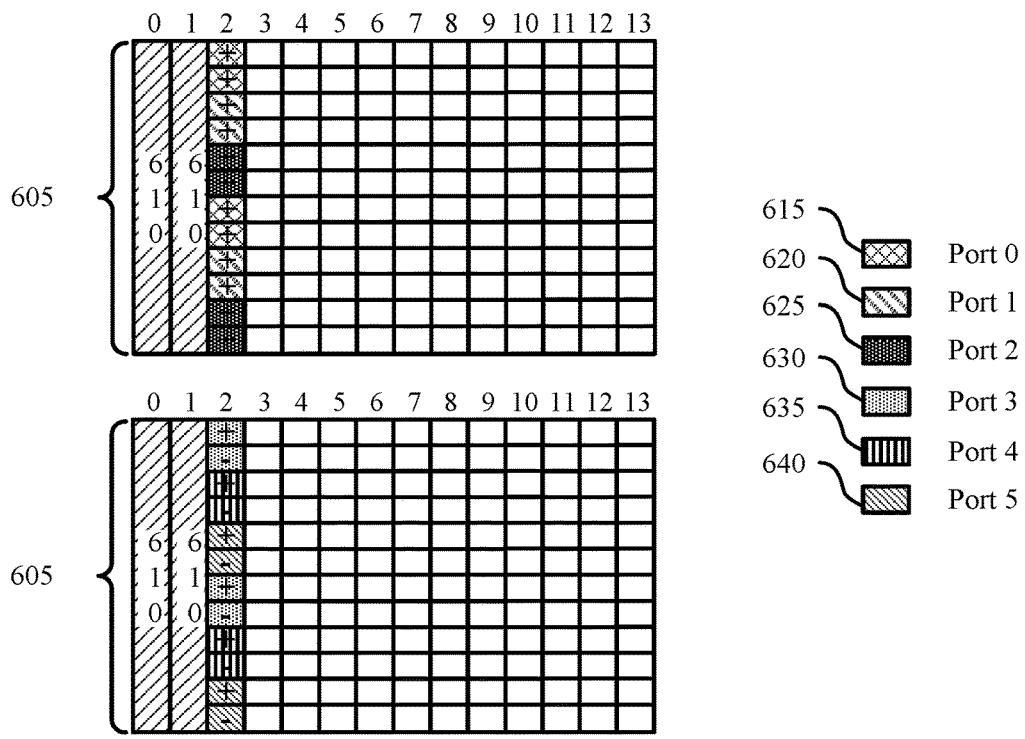
FIGS. 6A and 6B illustrate further examples of reference signal resources for different antenna ports that support reference signal transmission techniques in wireless communications in accordance with aspects of the present disclosure.
Figure 6B:
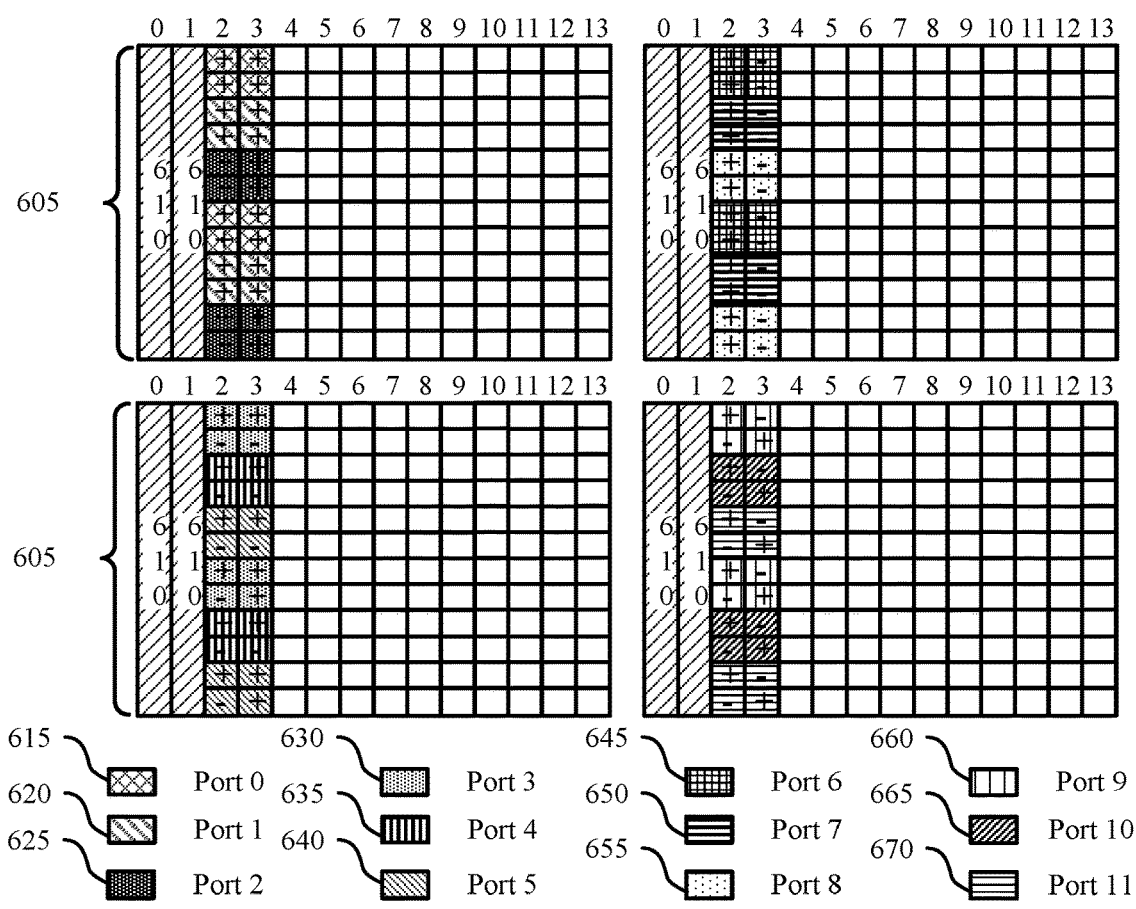

FIGS. 6A and 6B illustrate further examples of reference signal resources 600 for different antenna ports that support reference signal transmission techniques in wireless communications in accordance with various aspects of the present disclosure. In some examples, reference signal resources 600 may be used to implement aspects of wireless communication system 100. In the example of FIG. 6A, pairs of adjacent REs in the frequency domain within one-symbol configured DMRS resources may have an OCC applied thereto to provide for up to six ports 615 through 640. In this example, wireless resources 605 may have two control symbols 610, followed by a DMRS symbol. Thus, up to six UEs may concurrently transmit in such a configuration.

In the example, of FIG. 6B, two OFDM symbols may be allocated for DMRS transmissions and pairs of adjacent REs in both the frequency domain and time domain may have an OCC applied thereto which may provide up to 12 antenna ports 615 through 670. In each of the examples of FIGS. 5A, 5B, 6A, and 6B, a binary OCC is applied to allocated REs for different antenna ports. In some examples, non-binary OCCs can be applied to allocated DMRS REs which may increase the number of UEs that may be multiplexed, and will be described in more detail below with respect to FIG. 7.

Figure 7:
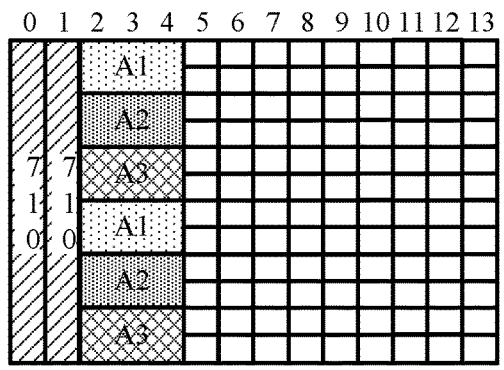
FIG. 7 illustrates an example of non-binary orthogonal cover codes that support reference signal transmission techniques in wireless communications in accordance with aspects of the present disclosure.
Figure 7:
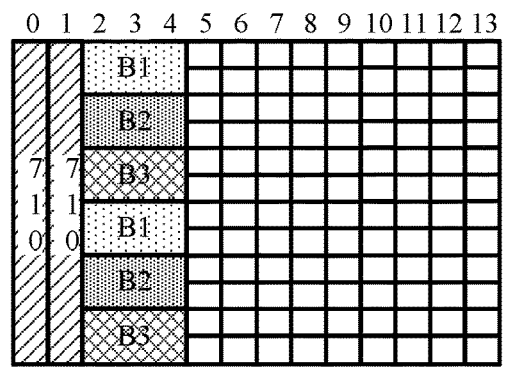
Figure 7:
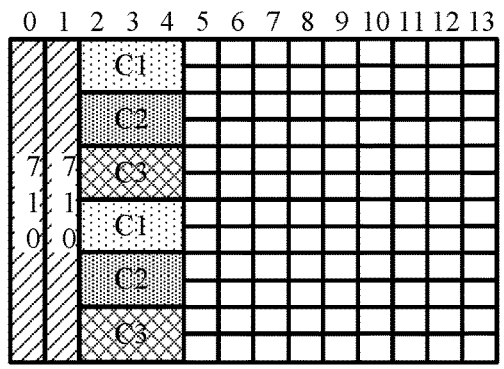
Figure 7:
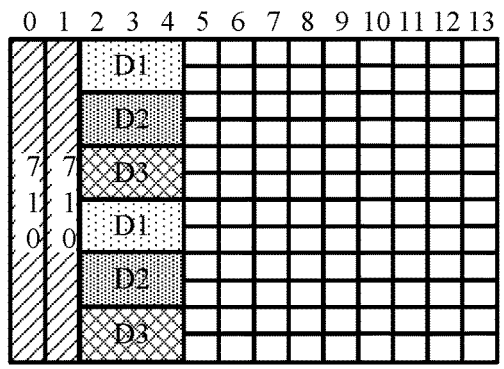
Figure 7:
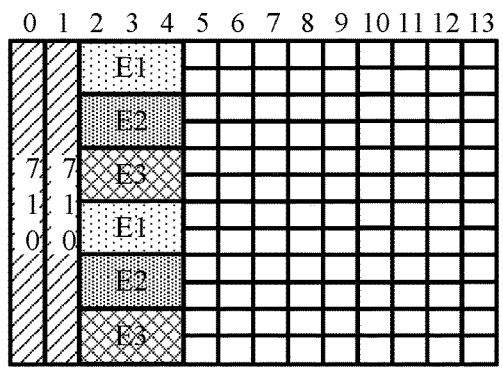
Figure 7:
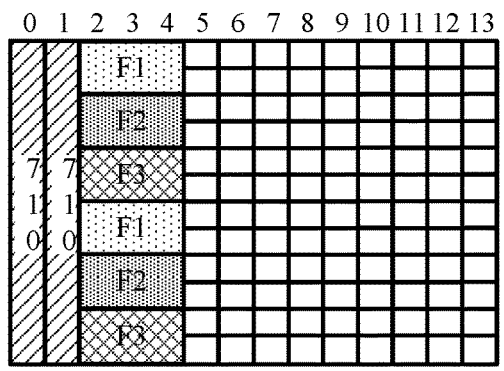

FIG. 7 illustrates an example of examples of reference signal resources 700 for different antenna ports that supports reference signal transmission techniques in wireless communications in accordance with various aspects of the present disclosure. In some examples, reference signal resources 700 may be used to implement aspects of wireless communication system 100. In the example of FIG. 7, three OFDM symbols may be allocated for DMRS transmissions, with two control symbols 710, followed by three DMRS symbols. In this example, two adjacent REs in the frequency domain and three adjacent REs in the time domain configured for DMRS transmission for an antenna port.

In this example, a up to six UEs sharing a same set of REs may use a length 2×3 non-binary OCC. Thus, up to 18 UEs may concurrently transmit in such a configuration. In the example FIG. 7, ports A1 through A3 may use configuration 715, ports B1 through B3 may use configuration 720, ports C1 through C3 may use configuration 725, ports D1 through D3 may use configuration 730, ports E1 through E3 may use configuration 735, and ports F1 through F3 may use configuration 740. Examples of non-binary OCCs that may be used for such configurations may include size-6 discrete Fourier transform (DFT) sequences, constant amplitude zero autocorrelation (CAZAC) sequences such as a length-6 Zadoff-Chu sequence with a same root and different cyclic shift, or orthogonal computer generated sequences (CGS) with a low peak to average power ratio (PAPR), to name but a few examples.

Figure 8:
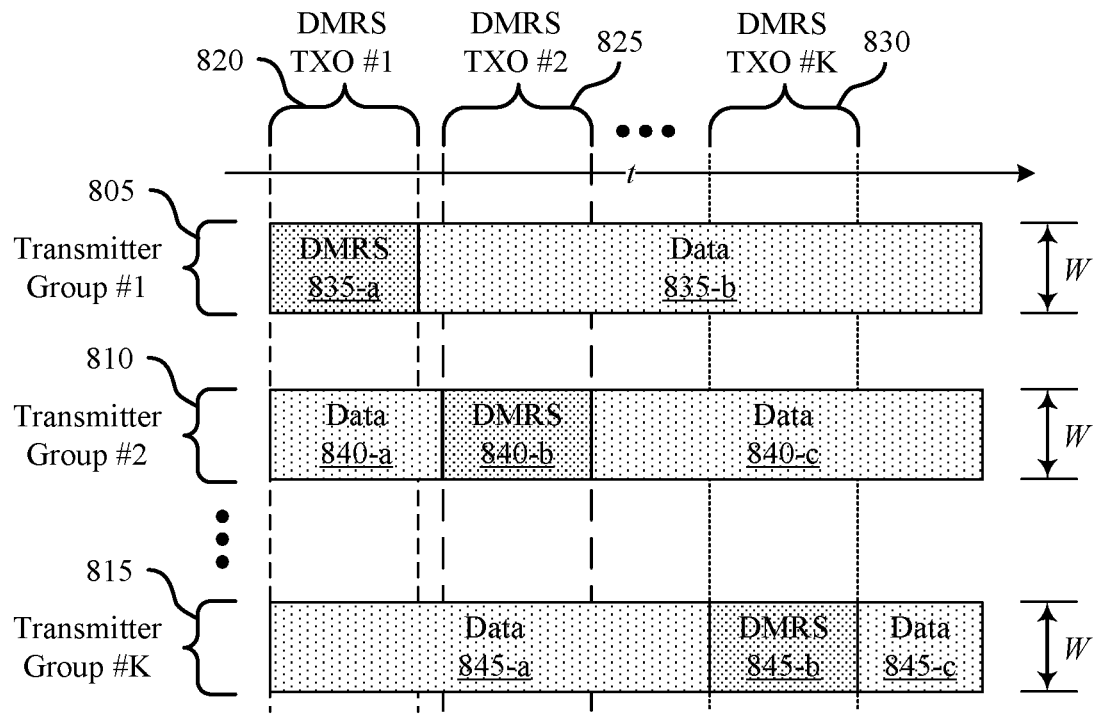
FIG. 8 illustrates an example of a wireless resources and different transmitter groups that have associated TXOs that support reference signal transmission techniques in wireless communications in accordance with aspects of the present disclosure.

FIG. 8 illustrates an example of wireless resources 800 and different transmitter groups that have associated TXOs that support reference signal transmission techniques in wireless communications in accordance with various aspects of the present disclosure. In some examples, wireless resources 800 may be used to implement aspects of wireless communication system 100. In the example of FIG. 8, similarly as discussed with respect to FIGS. 3 and 4, a number of UEs may be partitioned into a number of transmitter groups. In this example, a first transmitter group 805, a second transmitter group 810, and a $K^{th}$ transmitter group 815 are illustrated, each of which may include a number of UEs. Each transmitter group 805-815 has an associated TXO, and in this example the first transmitter group 805 has an associated first TXO 820, the second transmitter group 810 has an associated second TXO 825, and $K^{th}$ transmitter group 815 has an associated $K^{th}$ TXO 830. Each transmission group 805-815 may use a same frequency band W for transmissions.

In the example of FIG. 8, DMRS transmissions are floating and orthogonalized to provide that DMRS transmissions from different transmission groups are time division multiplexed. In this example, however, rather than entering a DTX mode prior to a DMRS TXO 820-830, a transmitter may transmit a data transmission. In such a manner, there is no collision between DMRS transmissions of different transmitter groups, and in some cases DMRS REs and data REs are orthogonal. Thus, in this case there is no staggering in the starting times of transmissions of different transmitter groups 805-815. Furthermore, data REs of different transmitter groups 805-815 may collide. In some cases, a transmitter may apply different transmission power to its DMRS REs and data REs. Accordingly, in this example, UEs of the first transmitter group 805 may transmit first DMRS transmissions 835-a in the first DMRS TXO 820, followed by first data transmissions 835-b. UEs of the second transmitter group 810 may transmit data transmissions 840-a before transmitting second DMRS transmissions 840-b in the second DMRS TXO 825, followed by second data transmissions 840-c. Such a pattern continues until UEs of transmitter group K 815 may transmit data transmissions 845-a before transmitting $K^{th}$ DMRS transmissions 845-b in the $K^{th}$ DMRS TXO 830, followed by data transmissions 845-c.

Figure 9:
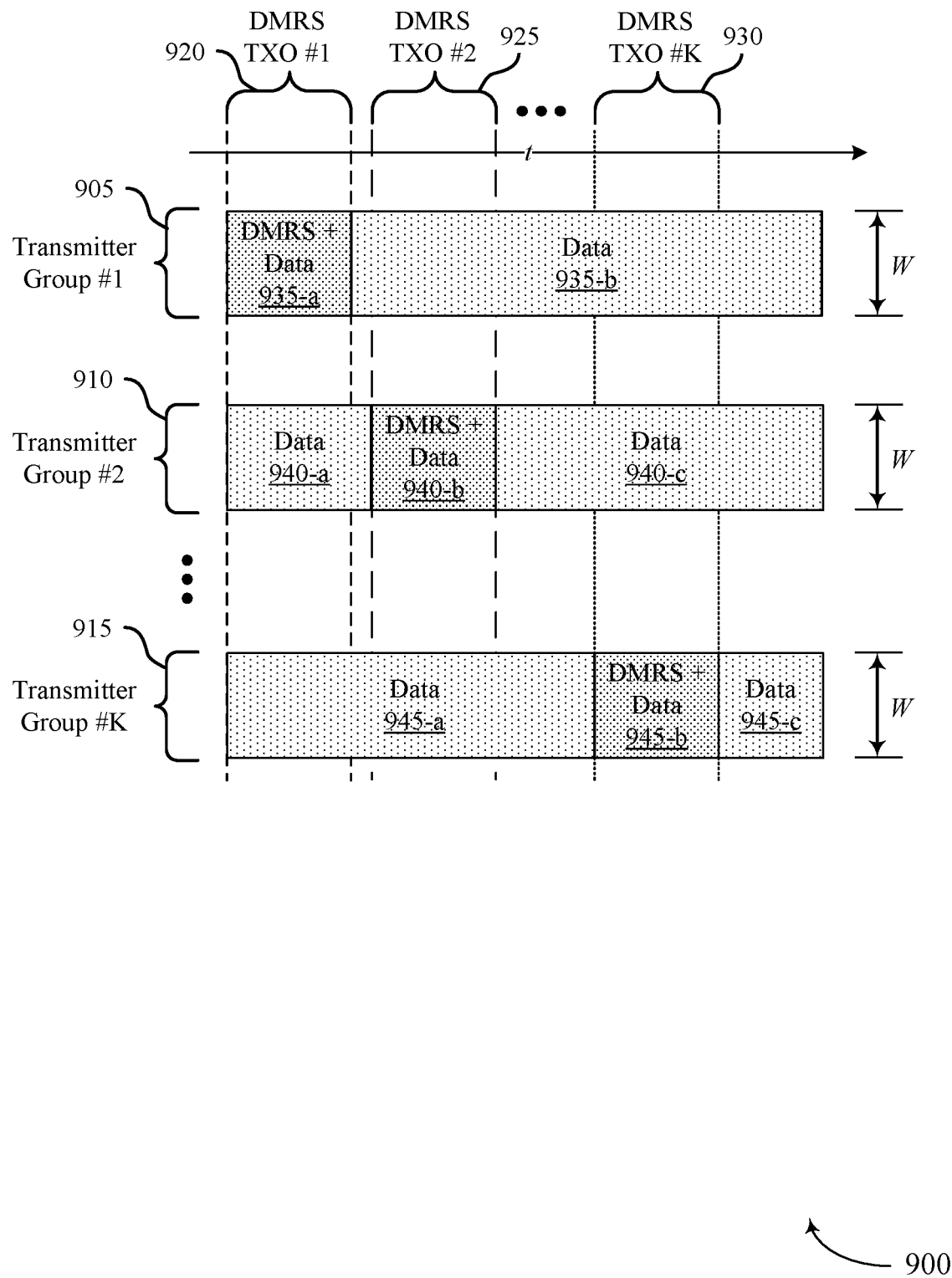
FIG. 9 illustrates a further example of a wireless resources and different transmitter groups that have associated TXOs that support reference signal transmission techniques in wireless communications in accordance with aspects of the present disclosure.

FIG. 9 illustrates an example of wireless resources 900 and different transmitter groups that have associated TXOs that support reference signal transmission techniques in wireless communications in accordance with various aspects of the present disclosure. In some examples, wireless resources 900 may be used to implement aspects of wireless communication system 100. In the example of FIG. 9, similarly as discussed with respect to FIGS. 3-4 and 8, a number of UEs may be partitioned into a number of transmitter groups. In this example, a first transmitter group 905, a second transmitter group 910, and a $K^{th}$ transmitter group 915 are illustrated, each of which may include a number of UEs. Each transmitter group 905-915 has an associated TXO, and in this example the first transmitter group 905 has an associated first TXO 920, the second transmitter group 910 has an associated second TXO 925, and $K^{th}$ transmitter group 915 has an associated $K^{th}$ TXO 930.

In the example of FIG. 9, the DMRS transmission for transmitter group K 915 is interlaced with data of transmitter group K 915 in the frequency domain and transmitted on DMRS TXO #K 930. In such a manner, data and DMRS may be transmitted in 945-b, and the frequency division interlacing provides that there is no intra-group collision between DMRS and data. In some examples, UEs of transmitter group K 915 may apply a same transmission power to DMRS and data transmissions on DMRS TXO #K 930. When data is transmitted on symbols without DMRS in 945-a and 945-c, then the data transmission can use a transmission power that is different from the DMRS transmission power. Additionally, the transmission power used by different transmitter groups 905-915 may be different.

Figure 10:
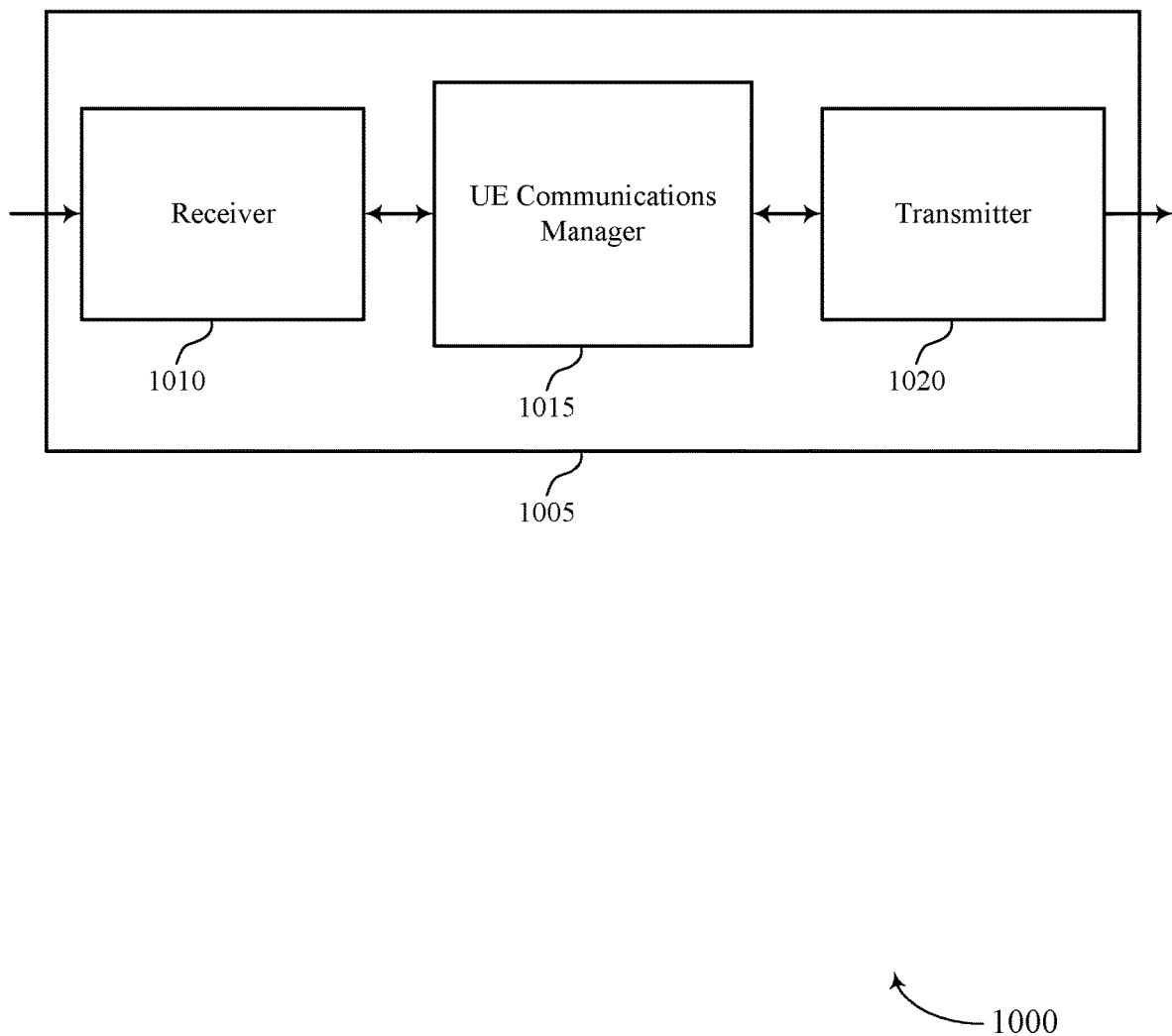
FIGS. 10 through 12 show block diagrams of a device that supports reference signal transmission techniques in wireless communications in accordance with aspects of the present disclosure.

FIG. 10 shows a block diagram 1000 of a wireless device 1005 that supports reference signal transmission techniques in wireless communications in accordance with aspects of the present disclosure. Wireless device 1005 may be an example of aspects of a user equipment (UE) 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to reference signal transmission techniques in wireless communications, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may identify a first transmitter group from a set of transmitter groups and a first reference signal transmission occasion (TXO) for a reference signal transmission, where each transmitter group of the set of transmitter groups has an associated reference signal TXO that is non-overlapping with other reference signal TXOs of other transmitter groups, determine a reference signal sequence for a reference signal to be transmitted in the first reference signal TXO, select an OCC to be applied to the reference signal sequence, where the OCC is selected from a set of available OCCs that includes non-binary OCCs, apply the selected OCC to the reference signal sequence to obtain the reference signal, and transmit the reference signal during the first reference signal TXO.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
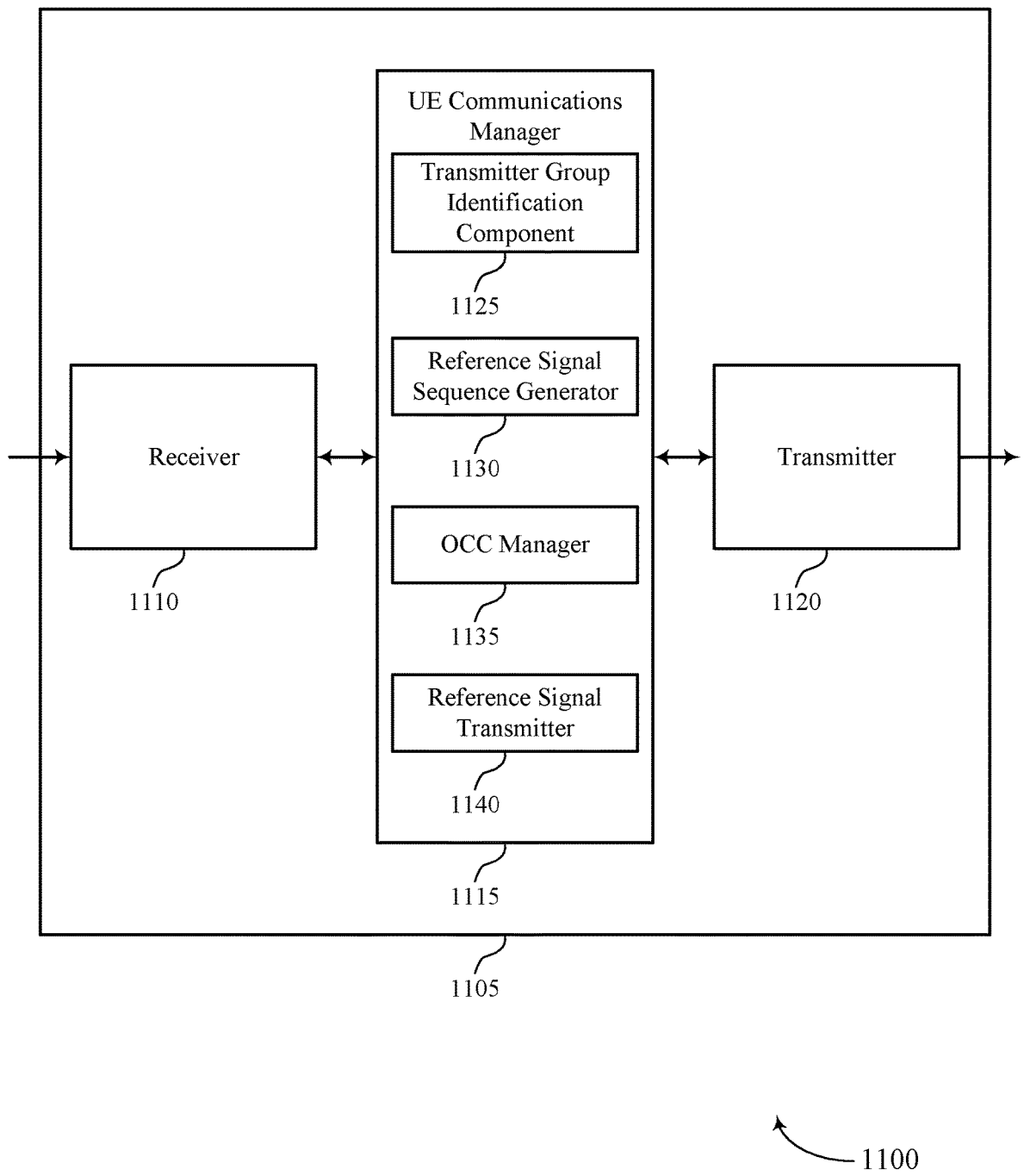

FIG. 11 shows a block diagram 1100 of a wireless device 1105 that supports reference signal transmission techniques in wireless communications in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to reference signal transmission techniques in wireless communications, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include transmitter group identification component 1125, reference signal sequence generator 1130, OCC manager 1135, and reference signal transmitter 1140.

Transmitter group identification component 1125 may identify a first transmitter group from a set of transmitter groups and a first reference signal TXO for a reference signal transmission, where each transmitter group of the set of transmitter groups has an associated reference signal TXO that is non-overlapping with other reference signal TXOs of other transmitter groups. In some cases, transmitter group identification component 1125 may determine that the first TXO follows a second reference signal TXO of a second transmitter group of the set of transmitter groups within a TTI, and determine that a third transmitter group of the set of transmitter groups has a third reference signal TXO that starts after the second TXO within the TTI. In some cases, the reference signal TXO includes one or more OFDM symbols. In some cases, the first reference signal TXO is directly adjacent to one or more other reference signal TXOs of one or more other of the set of transmitter groups, or one or more OFDM symbols separate the first reference signal TXO and a prior or subsequent reference signal TXO of one or more other of the set of transmitter groups. In some cases, the reference signal TXO resources are dynamically configured via a PDCCH transmission from a base station, or are semi-statically configured via RRC signaling from the base station.

Reference signal sequence generator 1130 may determine a reference signal sequence for a reference signal to be transmitted in the first reference signal TXO. In some cases, the reference signal sequence is determined independently of the reference signal TXO.

OCC manager 1135 may select an OCC to be applied to the reference signal sequence, where the OCC is selected from a set of available OCCs that includes non-binary and binary OCCs. OCC manager 1135 may apply the selected OCC to the reference signal sequence to obtain the reference signal. In some cases, a binary OCC or a non-binary OCC may be selected based on an overloading factor of NOMA transmissions, a system bandwidth, a time span of the first reference signal TXO, or any combination thereof. In some cases, the non-binary OCC sequence includes a CAZAC waveform, a DFT sequence, or a CGS with a low PAPR. In some cases, the CAZAC waveform is a Zadoff-Chu Sequence with a same root and different cyclic shift.

Reference signal transmitter 1140 may transmit the reference signal during the first reference signal TXO. Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
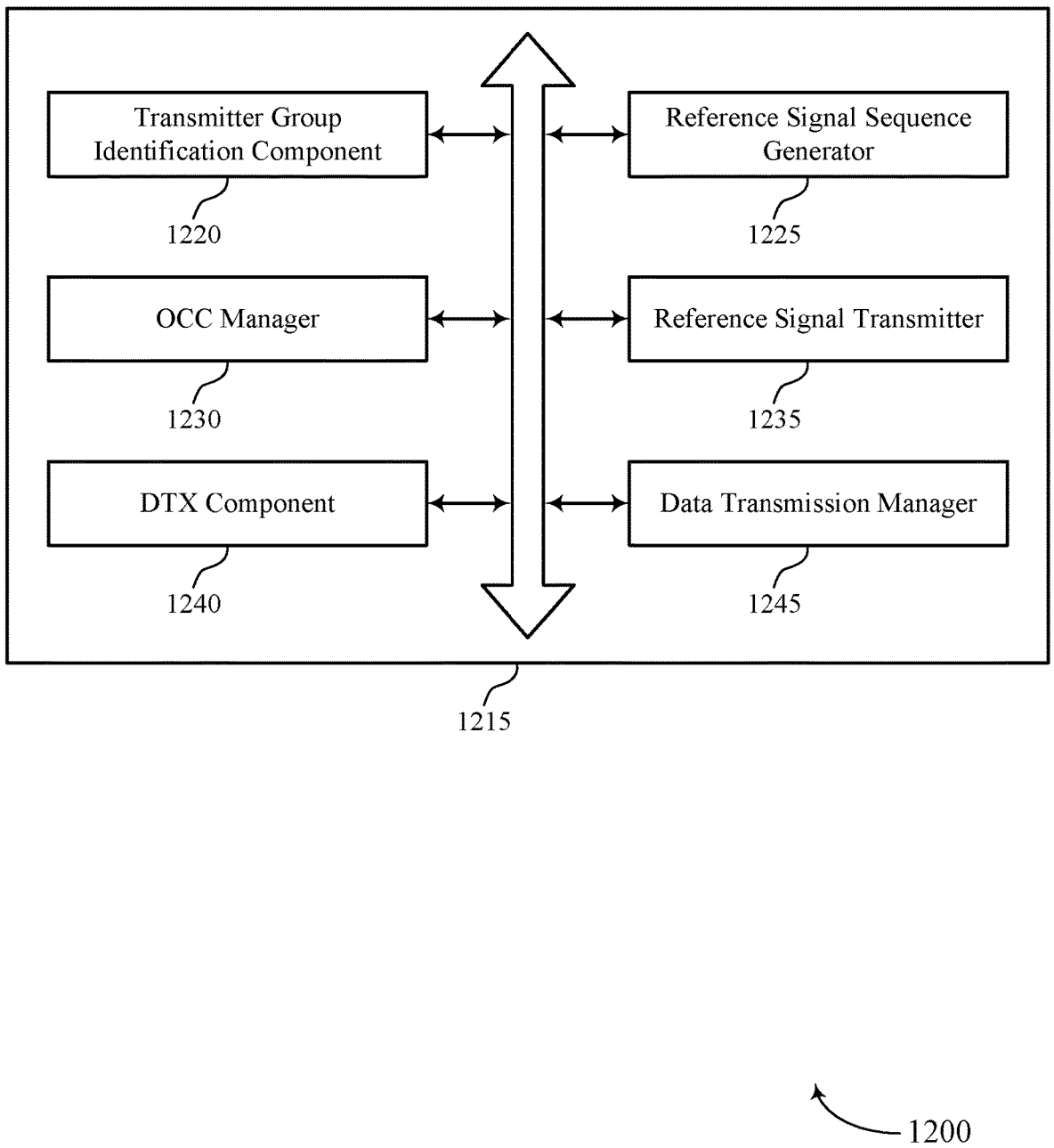

FIG. 12 shows a block diagram 1200 of a UE communications manager 1215 that supports reference signal transmission techniques in wireless communications in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include transmitter group identification component 1220, reference signal sequence generator 1225, OCC manager 1230, reference signal transmitter 1235, DTX component 1240, and data transmission manager 1245. Each of these modules may communicate, directly or indirectly, with one another (e.g., via one or more buses).

Transmitter group identification component 1220 may identify a first transmitter group from a set of transmitter groups and a first reference signal TXO for a reference signal transmission, where each transmitter group of the set of transmitter groups has an associated reference signal TXO that is non-overlapping with other reference signal TXOs of other transmitter groups. In some cases, transmitter group identification component 1220 may determine that the first TXO follows a second reference signal TXO of a second transmitter group of the set of transmitter groups within a TTI, and determine that a third transmitter group of the set of transmitter groups has a third reference signal TXO that starts after the second TXO within the TTI. In some cases, the reference signal TXO includes one or more OFDM symbols. In some cases, the first reference signal TXO is directly adjacent to one or more other reference signal TXOs of one or more other of the set of transmitter groups, or one or more OFDM symbols separate the first reference signal TXO and a prior or subsequent reference signal TXO of one or more other of the set of transmitter groups. In some cases, the reference signal TXO resources are dynamically configured via a PDCCH transmission from a base station, or are semi-statically configured via RRC signaling from the base station.

Reference signal sequence generator 1225 may determine a reference signal sequence for a reference signal to be transmitted in the first reference signal TXO. In some cases, the reference signal sequence is determined independently of the reference signal TXO.

OCC manager 1230 may select an OCC to be applied to the reference signal sequence, where the OCC is selected from a set of available OCCs that includes non-binary and binary OCCs. OCC manager 1230 may apply the selected OCC to the reference signal sequence to obtain the reference signal. In some cases, a binary OCC or a non-binary OCC may be selected based on an overloading factor of NOMA transmissions, a system bandwidth, a time span of the first reference signal TXO, or any combination thereof. In some cases, the non-binary OCC sequence includes a CAZAC waveform, a DFT sequence, or a CGS with a low PAPR. In some cases, the CAZAC waveform is a Zadoff-Chu Sequence with a same root and different cyclic shift.

Reference signal transmitter 1235 may transmit the reference signal during the first reference signal TXO. DTX component 1240 may enter a DTX mode for a portion of the TTI until the start of the first reference signal TXO.

Data transmission manager 1245 may transmit a data transmission concurrently with one or more reference signal transmissions of one or more transmitters of one or more other transmitter groups. In some cases, data transmission manager 1245 may transmit, after transmitting the reference signal, one or more data transmissions, and a first transmit power used for the reference signal is different than a second transmit power used for the one or more data transmissions. In some cases, data transmission manager 1245 may determine one or more data transmissions that are to be transmitted during the first reference signal TXO, interlace the one or more data transmissions with the reference signal, and transmit the one or more data transmissions interlaced with the reference signal during the first reference signal TXO. In some cases, data transmission manager 1245 may transmit a portion of a first data transmission after the first reference signal TXO and concurrently with a second reference signal TXO of a second transmitter group of the set of transmitter groups, determine that a portion of a second data transmission is to be transmitted during the first reference signal TXO, interlace the portion of the second data transmission with the reference signal, transmit the portion of the second data transmission interlaced with the reference signal during the first reference signal TXO, and transmit a first data transmission prior to the first reference signal TXO and concurrently with a second reference signal TXO of a second transmitter group of the set of transmitter groups.

In some cases, the reference signal of the first transmitter group is transmitted using a same transmit power as the first data transmission of a first transmitter group on the first reference signal TXO, and the first data transmission is transmitted using a different transmit power than the reference signal when the first data transmission is not transmitted on the first reference signal TXO. In some cases, the transmit power of the reference signal and the first data transmission are different from the transmit power of the second reference signal and the second data transmission. In some cases, the reference signal is transmitted using a same transmit power as the one or more data transmissions. In some cases, one or more REs for the data transmission are selected to be different than reference signal REs of the one or more reference signal transmissions of the one or more transmitters of another transmitter group. In some cases, one or more REs used for the data transmission are different than REs used for reference signal transmissions by one or more transmitters of the second transmitter group during the second reference signal TXO. In some cases, a first transmit power used for the data transmission prior to the first reference signal TXO is different than a second transmit power used for the reference signal transmission during the first reference signal TXO.

Figure 13:
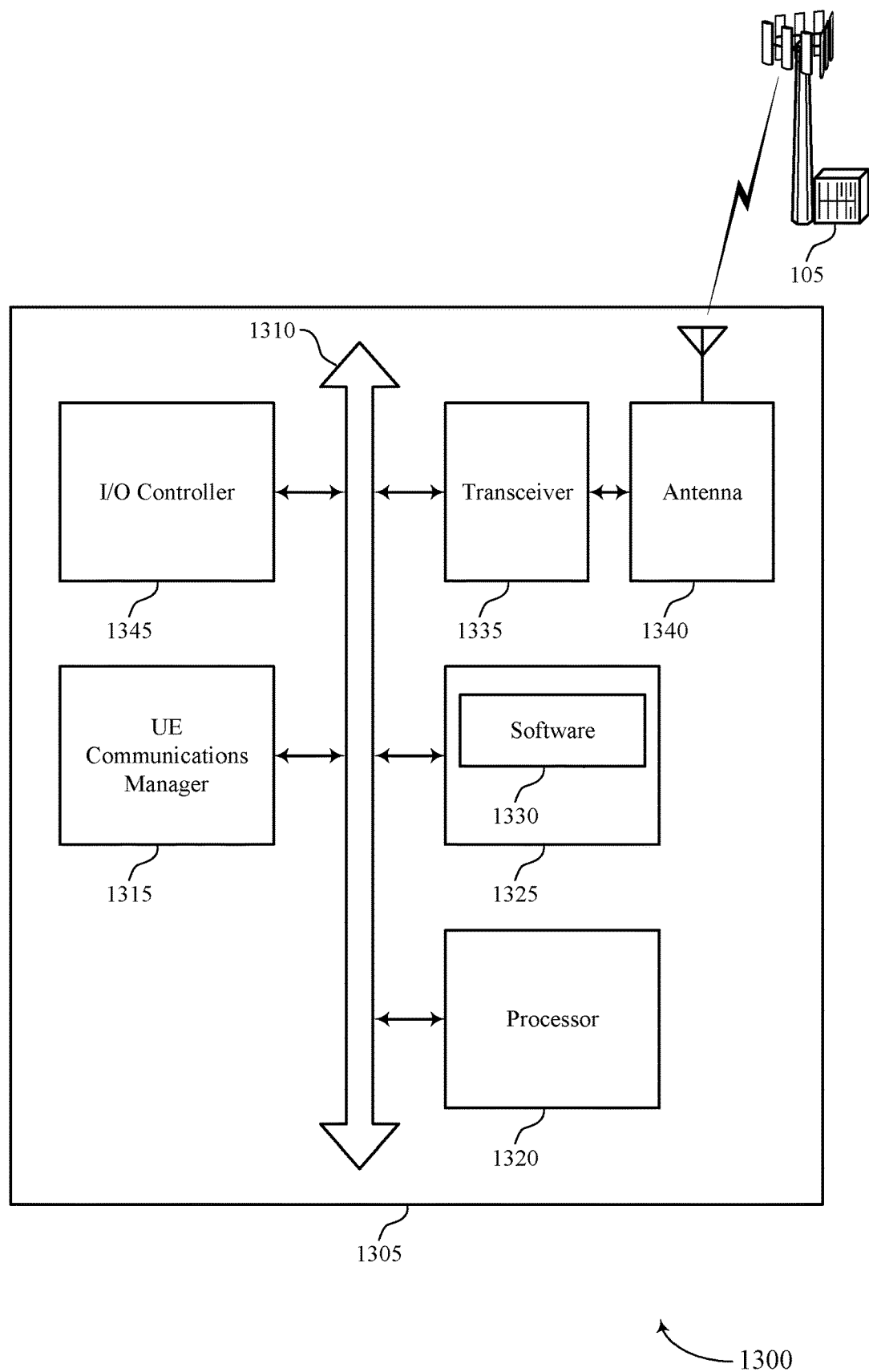
FIG. 13 illustrates a block diagram of a system including a UE that supports reference signal transmission techniques in wireless communications in accordance with aspects of the present disclosure.

FIG. 13 shows a diagram of a system 1300 including a device 1305 that supports reference signal transmission techniques in wireless communications in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting reference signal transmission techniques in wireless communications).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support reference signal transmission techniques in wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
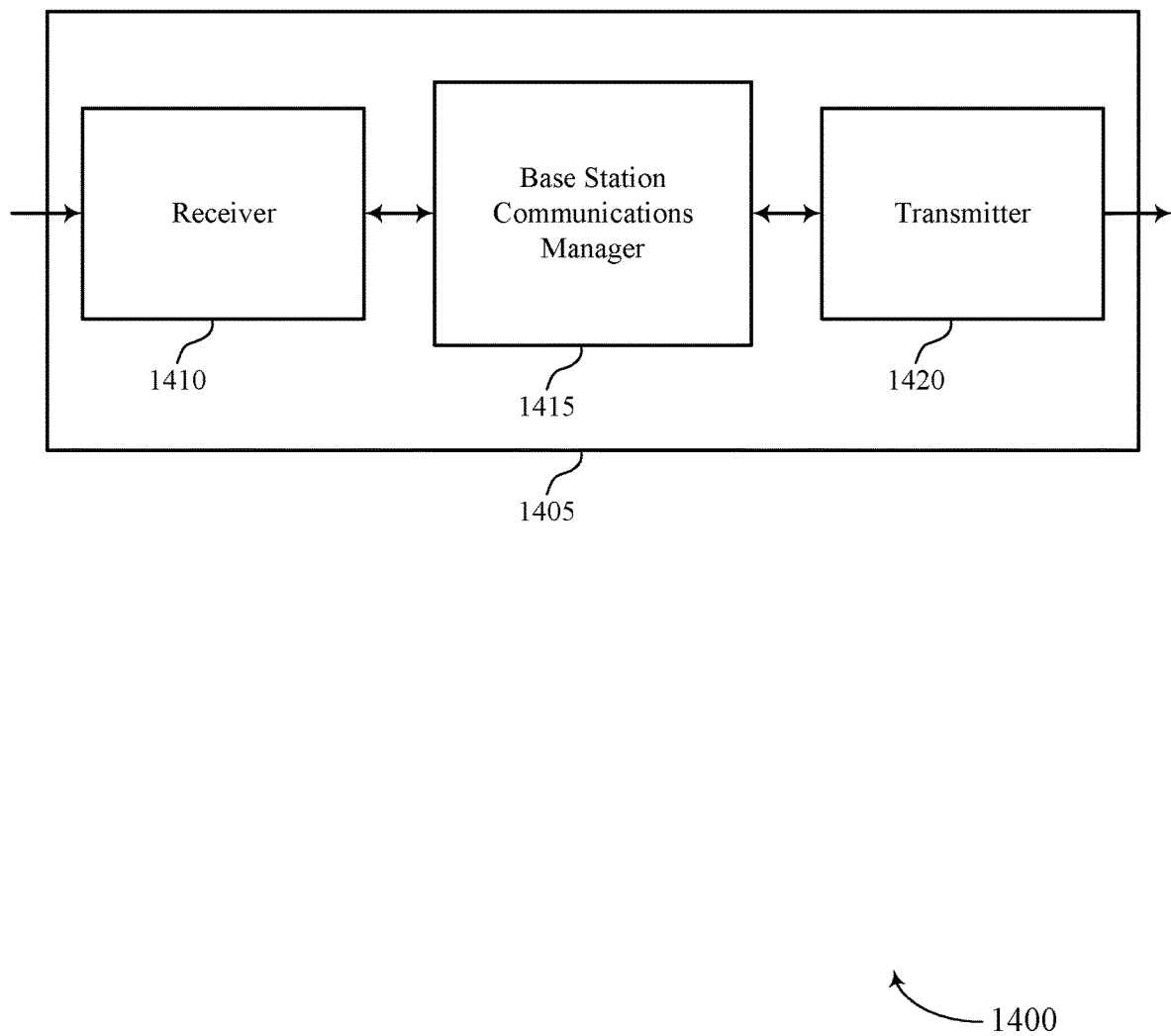
FIGS. 14 through 16 show block diagrams of a device that supports reference signal transmission techniques in wireless communications in accordance with aspects of the present disclosure.

FIG. 14 shows a block diagram 1400 of a wireless device 1405 that supports reference signal transmission techniques in wireless communications in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to reference signal transmission techniques in wireless communications, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17.

Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may configure a set of transmitter groups each having a set of transmitters and an associated reference signal TXO for reference signal transmissions, where each reference signal TXO is non-overlapping with other reference signal TXOs of other transmitter groups, receive a set of reference signals from one or more transmitters within each of the set of transmitter groups, at least a first reference signal of a first transmitter in a first transmitter group received concurrently with a data transmission of a second transmitter in a second transmitter group, and determine a decoding order for a successive interference cancellation (SIC) procedure to be used for decoding subsequent transmissions of the first transmitter and the second transmitter based on the set of reference signals.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
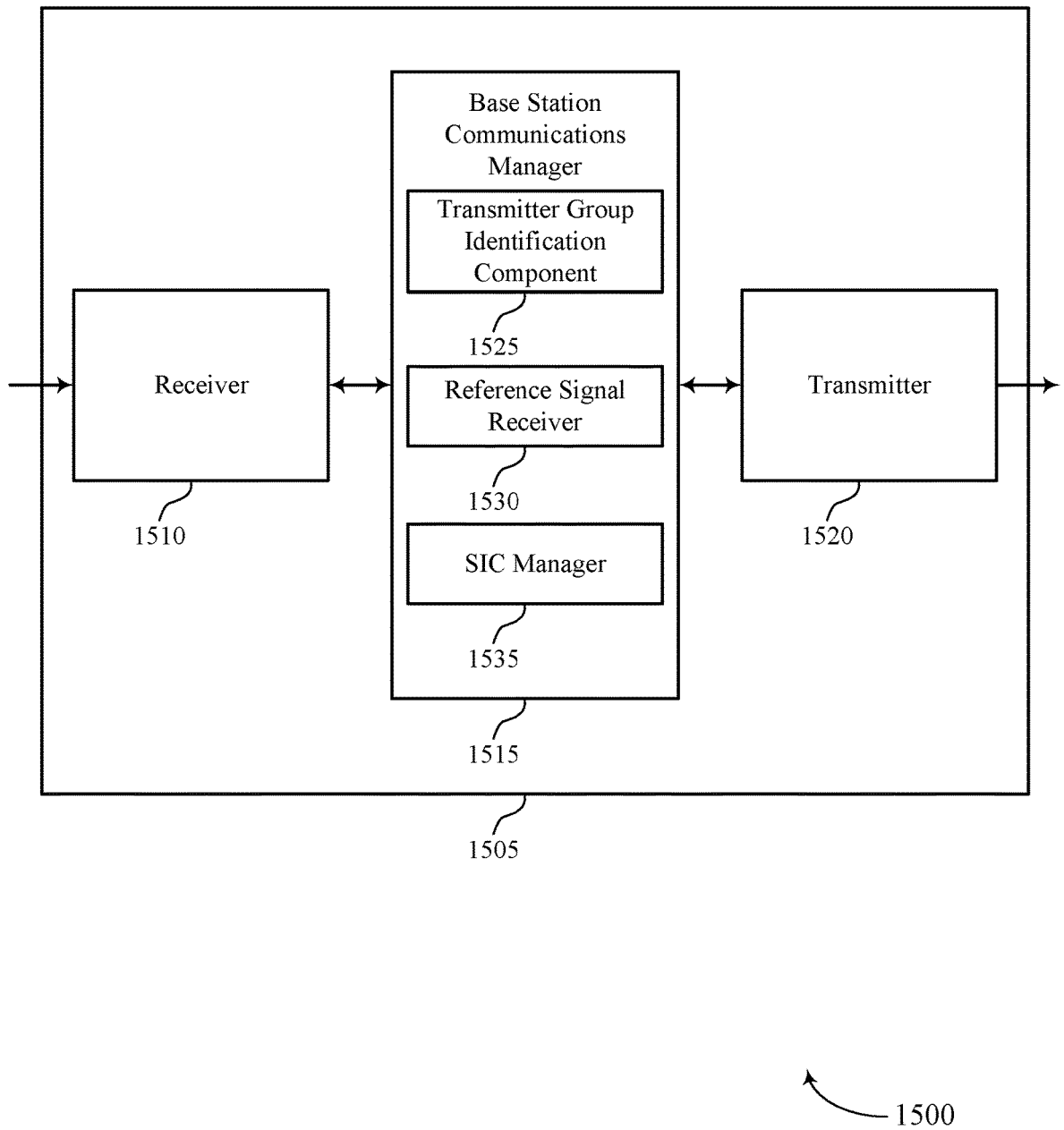

FIG. 15 shows a block diagram 1500 of a wireless device 1505 that supports reference signal transmission techniques in wireless communications in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to reference signal transmission techniques in wireless communications, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17. Base station communications manager 1515 may also include transmitter group identification component 1525, reference signal receiver 1530, and SIC manager 1535.

Transmitter group identification component 1525 may configure a set of transmitter groups each having a set of transmitters and an associated reference signal TXO for reference signal transmissions, where each reference signal TXO is non-overlapping with other reference signal TXOs of other transmitter groups. In some cases, each reference signal TXO includes one or more OFDM symbols. In some cases, a first reference signal TXO of a first transmitter group is directly adjacent to one or more other reference signal TXOs of one or more other of the set of transmitter groups, or one or more OFDM symbols separate the first reference signal TXO and a prior or subsequent reference signal TXO of one or more other of the set of transmitter groups. In some cases, the reference signal TXO resources are dynamically configured via a PDCCH transmission, or are semi-statically configured via RRC signaling.

Reference signal receiver 1530 may receive a set of reference signals from one or more transmitters within each of the set of transmitter groups, at least a first reference signal of a first transmitter in a first transmitter group received concurrently with a data transmission of a second transmitter in a second transmitter group.

SIC manager 1535 may determine a decoding order for a SIC procedure to be used for decoding subsequent transmissions of the first transmitter and the second transmitter based on the set of reference signals. In some cases, the decoding order is based on an order in which the set of transmitter groups transmit reference signals, a power of the reference signal transmissions, a channel quality associated with each transmitter group of the set of transmitter groups, or any combination thereof.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
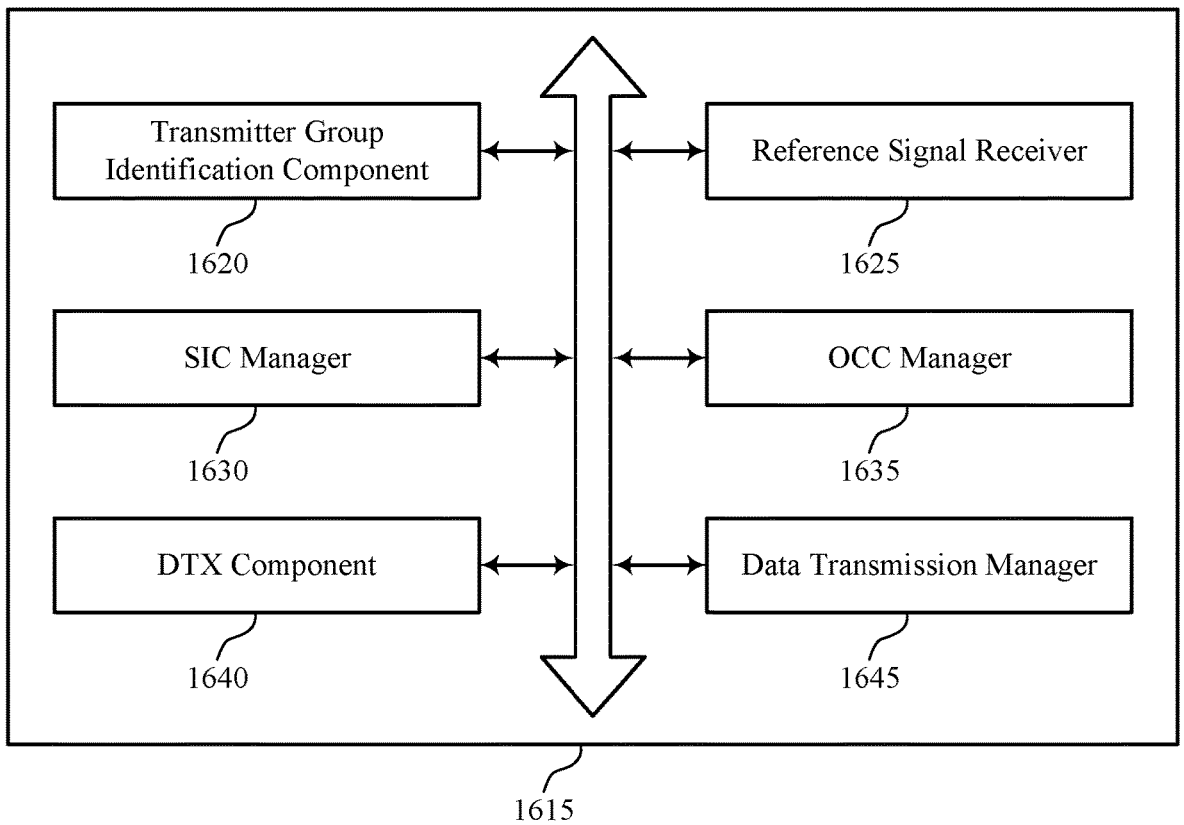

FIG. 16 shows a block diagram 1600 of a base station communications manager 1615 that supports reference signal transmission techniques in wireless communications in accordance with aspects of the present disclosure. The base station communications manager 1615 may be an example of aspects of a base station communications manager 1715 described with reference to FIGS. 14, 15, and 17. The base station communications manager 1615 may include transmitter group identification component 1620, reference signal receiver 1625, SIC manager 1630, OCC manager 1635, DTX component 1640, and data transmission manager 1645. Each of these modules may communicate, directly or indirectly, with one another (e.g., via one or more buses).

Transmitter group identification component 1620 may configure a set of transmitter groups each having a set of transmitters and an associated reference signal TXO for reference signal transmissions, where each reference signal TXO is non-overlapping with other reference signal TXOs of other transmitter groups. In some cases, each reference signal TXO includes one or more OFDM symbols. In some cases, a first reference signal TXO of a first transmitter group is directly adjacent to one or more other reference signal TXOs of one or more other of the set of transmitter groups, or one or more OFDM symbols separate the first reference signal TXO and a prior or subsequent reference signal TXO of one or more other of the set of transmitter groups. In some cases, the reference signal TXO resources are dynamically configured via a PDCCH transmission, or are semi-statically configured via RRC signaling.

Reference signal receiver 1625 may receive a set of reference signals from one or more transmitters within each of the set of transmitter groups, at least a first reference signal of a first transmitter in a first transmitter group received concurrently with a data transmission of a second transmitter in a second transmitter group.

SIC manager 1630 may determine a decoding order for a SIC procedure to be used for decoding subsequent transmissions of the first transmitter and the second transmitter based on the set of reference signals. In some cases, the decoding order is based on an order in which the set of transmitter groups transmit reference signals, a power of the reference signal transmissions, a channel quality associated with each transmitter group of the set of transmitter groups, or any combination thereof.

OCC manager 1635 may configure each transmitter group with TXO resources and an OCC to be applied to the reference signal transmissions, the OCC selected from a set of available OCCs that includes binary and non-binary OCCs. In some cases, the non-binary OCC sequence includes a CAZAC waveform, a DFT sequence, or a CGS.

DTX component 1640 may configure transmitters of each transmitter group to enter a DTX mode for a portion of a TTI until the start of the reference signal TXO associated with the respective transmitter group.

Data transmission manager 1645 may configure one or more data transmissions to be transmitted during the reference signal TXOs through interlacing the one or more data transmissions with the reference signal transmissions within the reference signal TXO. In some cases, the configuring includes configuring transmitters of one or more of the transmitter groups to transmit a data transmission prior to a corresponding reference signal TXO and concurrently with a reference signal TXO of another transmitter group of the set of transmitter groups. In some cases, the configuring includes configuring transmitters of the one or more transmitter groups to interlace a portion of data transmissions with reference signal transmissions within their respective reference signal TXOs, and configuring at least a first transmitter group to time division multiplex a corresponding first reference signal TXO with other data transmissions of the first transmitter group.

Figure 17:
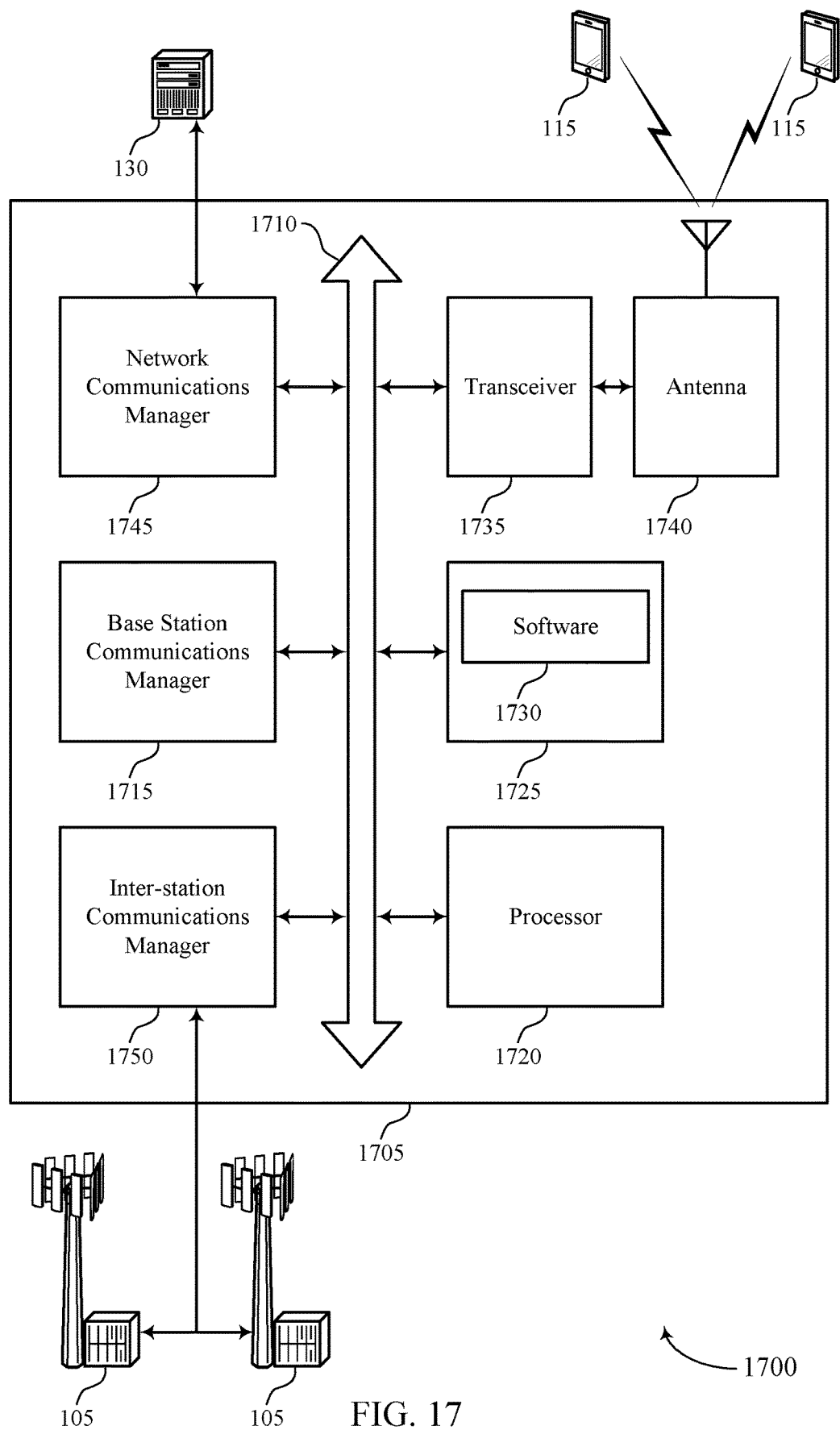
FIG. 17 illustrates a block diagram of a system including a base station that supports reference signal transmission techniques in wireless communications in accordance with aspects of the present disclosure.

FIG. 17 shows a diagram of a system 1700 including a device 1705 that supports reference signal transmission techniques in wireless communications in accordance with aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting reference signal transmission techniques in wireless communications).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support reference signal transmission techniques in wireless communications. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an Long Term Evolution (LTE)/LTE-A wireless communication network technology to provide communication between base stations 105.

Figure 18:
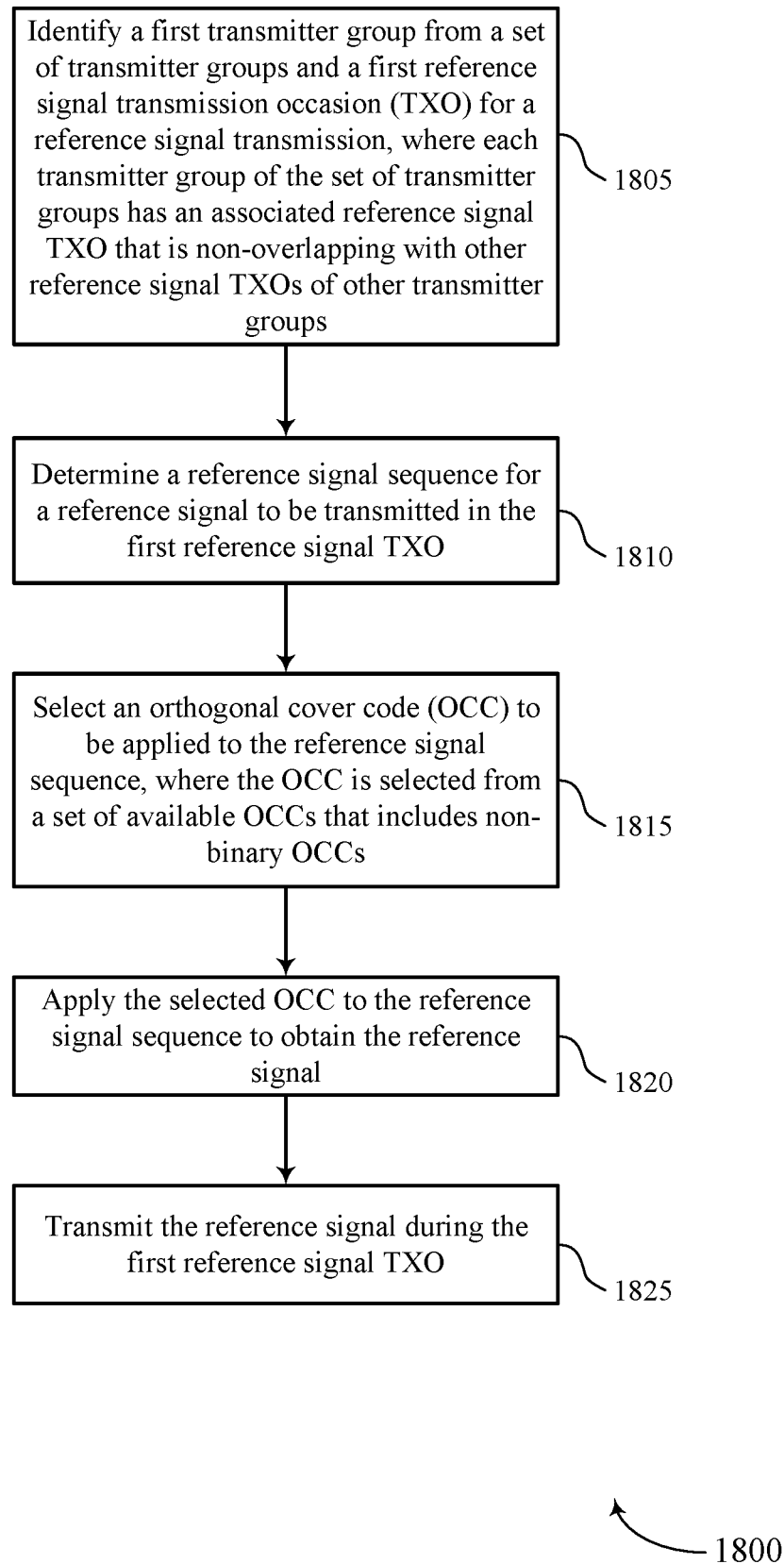
FIGS. 18 through 22 illustrate methods for reference signal transmission techniques in wireless communications in accordance with aspects of the present disclosure.

FIG. 18 shows a flowchart illustrating a method 1800 for reference signal transmission in wireless communications in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may identify a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups. The operations of 1805 may be performed according to the methods described herein. In certain examples, aspects of the operations of 1805 may be performed by a transmitter group identification component as described with reference to FIGS. 10 through 13.

At 1810 the UE 115 may determine a reference signal sequence for a reference signal to be transmitted in the first reference signal TXO. The operations of 1810 may be performed according to the methods described herein. In certain examples, aspects of the operations of 1810 may be performed by a reference signal sequence generator as described with reference to FIGS. 10 through 13.

At 1815 the UE 115 may select an OCC to be applied to the reference signal sequence, wherein the OCC is selected from a set of available OCCs that includes non-binary OCCs. The operations of 1815 may be performed according to the methods described herein. In certain examples, aspects of the operations of 1815 may be performed by a OCC manager as described with reference to FIGS. 10 through 13.

At 1820 the UE 115 may apply the selected OCC to the reference signal sequence to obtain the reference signal. The operations of 1820 may be performed according to the methods described herein. In certain examples, aspects of the operations of 1820 may be performed by a OCC manager as described with reference to FIGS. 10 through 13.

At 1825 the UE 115 may transmit the reference signal during the first reference signal TXO. The operations of 1825 may be performed according to the methods described herein. In certain examples, aspects of the operations of 1825 may be performed by a reference signal transmitter as described with reference to FIGS. 10 through 13.

Figure 19:
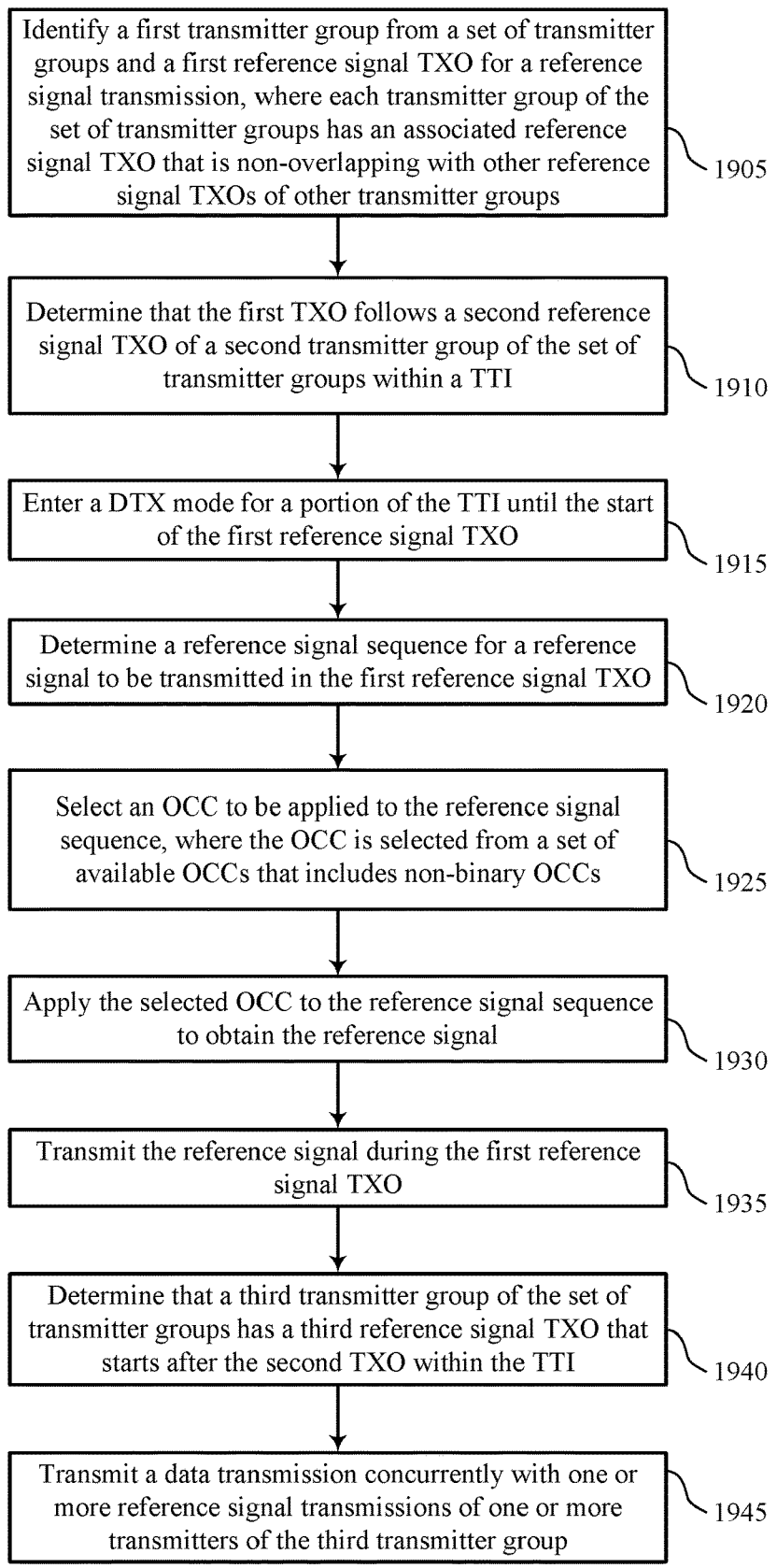

FIG. 19 shows a flowchart illustrating a method 1900 for reference signal transmission in wireless communications in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may identify a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups. The operations of 1905 may be performed according to the methods described herein. In certain examples, aspects of the operations of 1905 may be performed by a transmitter group identification component as described with reference to FIGS. 10 through 13.

At 1910 the UE 115 may determine that the first TXO follows a second reference signal TXO of a second transmitter group of the plurality of transmitter groups within a TTI. The operations of 1910 may be performed according to the methods described herein. In certain examples, aspects of the operations of 1910 may be performed by a transmitter group identification component as described with reference to FIGS. 10 through 13.

At 1915 the UE 115 may enter a DTX mode for a portion of the TTI until the start of the first reference signal TXO. The operations of 1915 may be performed according to the methods described herein. In certain examples, aspects of the operations of 1915 may be performed by a DTX component as described with reference to FIGS. 10 through 13.

At 1920 the UE 115 may determine a reference signal sequence for a reference signal to be transmitted in the first reference signal TXO. The operations of 1920 may be performed according to the methods described herein. In certain examples, aspects of the operations of 1920 may be performed by a reference signal sequence generator as described with reference to FIGS. 10 through 13.

At 1925 the UE 115 may select an OCC to be applied to the reference signal sequence, wherein the OCC is selected from a set of available OCCs that includes non-binary OCCs. The operations of 1925 may be performed according to the methods described herein. In certain examples, aspects of the operations of 1925 may be performed by a OCC manager as described with reference to FIGS. 10 through 13.

At 1930 the UE 115 may apply the selected OCC to the reference signal sequence to obtain the reference signal. The operations of 1930 may be performed according to the methods described herein. In certain examples, aspects of the operations of 1930 may be performed by a OCC manager as described with reference to FIGS. 10 through 13.

At 1935 the UE 115 may transmit the reference signal during the first reference signal TXO. The operations of 1935 may be performed according to the methods described herein. In certain examples, aspects of the operations of 1935 may be performed by a reference signal transmitter as described with reference to FIGS. 10 through 13.

At 1940 the UE 115 may determine that a third transmitter group of the plurality of transmitter groups has a third reference signal TXO that starts after the second TXO within the TTI. The operations of 1940 may be performed according to the methods described herein. In certain examples, aspects of the operations of 1940 may be performed by a transmitter group identification component as described with reference to FIGS. 10 through 13.

At 1945 the UE 115 may transmit a data transmission concurrently with one or more reference signal transmissions of one or more transmitters of the third transmitter group. The operations of 1945 may be performed according to the methods described herein. In certain examples, aspects of the operations of 1945 may be performed by a data transmission manager as described with reference to FIGS. 10 through 13.

Figure 20:
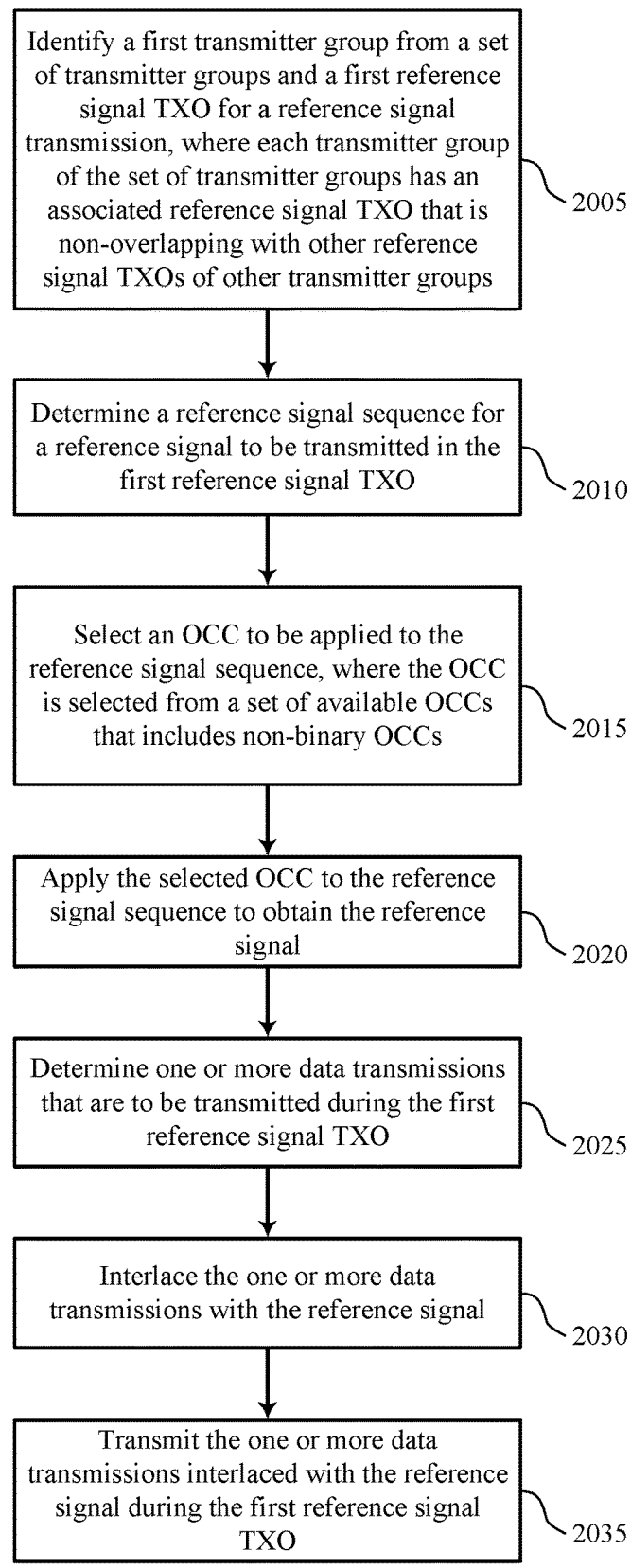

FIG. 20 shows a flowchart illustrating a method 2000 for reference signal transmission in wireless communications in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may identify a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups. The operations of 2005 may be performed according to the methods described herein. In certain examples, aspects of the operations of 2005 may be performed by a transmitter group identification component as described with reference to FIGS. 10 through 13.

At 2010 the UE 115 may determine a reference signal sequence for a reference signal to be transmitted in the first reference signal TXO. The operations of 2010 may be performed according to the methods described herein. In certain examples, aspects of the operations of 2010 may be performed by a reference signal sequence generator as described with reference to FIGS. 10 through 13.

At 2015 the UE 115 may select an OCC to be applied to the reference signal sequence, wherein the OCC is selected from a set of available OCCs that includes non-binary OCCs. The operations of 2015 may be performed according to the methods described herein. In certain examples, aspects of the operations of 2015 may be performed by a OCC manager as described with reference to FIGS. 10 through 13.

At 2020 the UE 115 may apply the selected OCC to the reference signal sequence to obtain the reference signal. The operations of 2020 may be performed according to the methods described herein. In certain examples, aspects of the operations of 2020 may be performed by a OCC manager as described with reference to FIGS. 10 through 13.

At 2025 the UE 115 may determine one or more data transmissions that are to be transmitted during the first reference signal TXO. The operations of 2025 may be performed according to the methods described herein. In certain examples, aspects of the operations of 2025 may be performed by a data transmission manager as described with reference to FIGS. 10 through 13.

At 2030 the UE 115 may interlace the one or more data transmissions with the reference signal. The operations of 2030 may be performed according to the methods described herein. In certain examples, aspects of the operations of 2030 may be performed by a data transmission manager as described with reference to FIGS. 10 through 13.

At 2035 the UE 115 may transmit the one or more data transmissions interlaced with the reference signal during the first reference signal TXO. The operations of 2035 may be performed according to the methods described herein. In certain examples, aspects of the operations of 2035 may be performed by a data transmission manager as described with reference to FIGS. 10 through 13.

Figure 21:
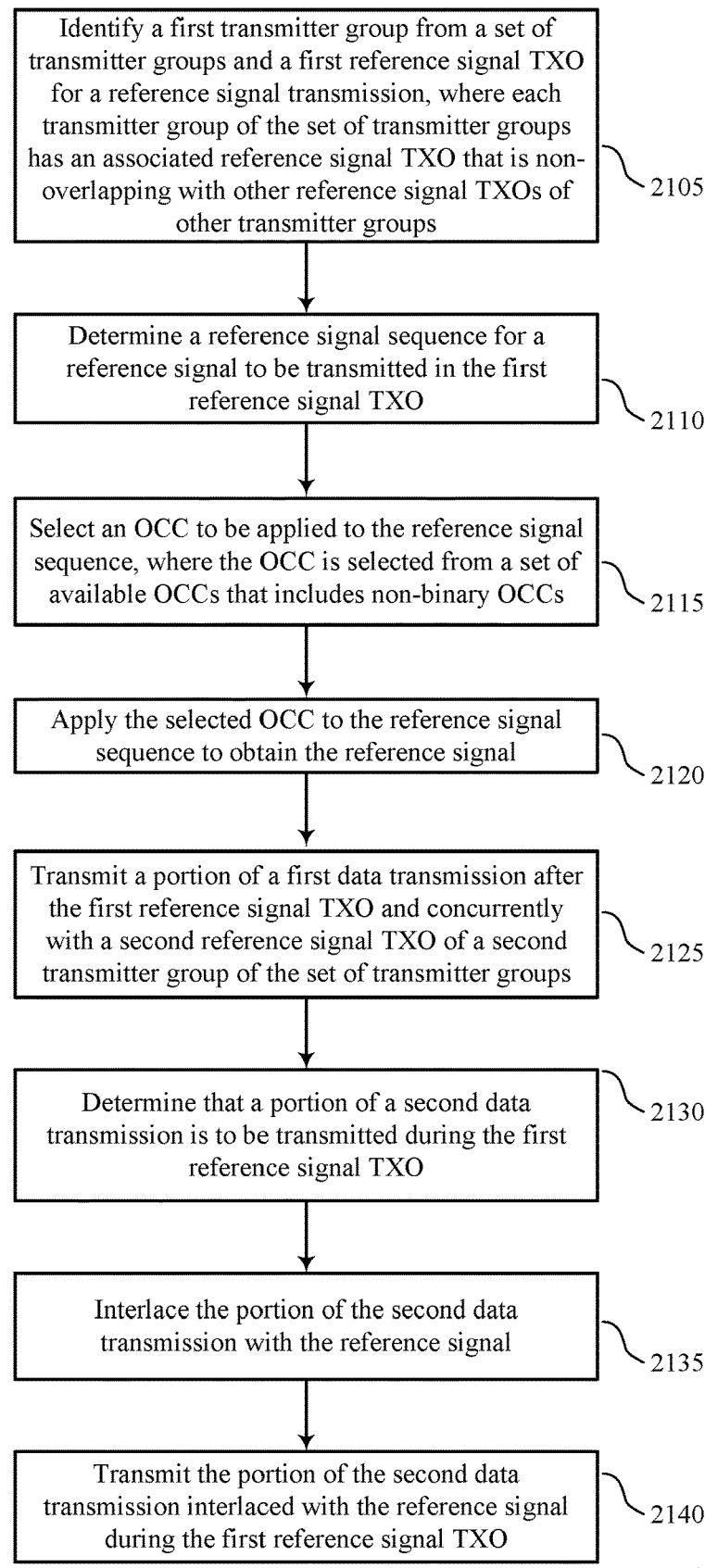

FIG. 21 shows a flowchart illustrating a method 2100 for reference signal transmission in wireless communications in accordance with aspects of the present disclosure. The operations of method 2100 may be implemented by a UE 115 or its components as described herein. For example, the operations of method 2100 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may identify a first transmitter group from a plurality of transmitter groups and a first reference signal TXO for a reference signal transmission, wherein each transmitter group of the plurality of transmitter groups has an associated reference signal TXO that is non-overlapping with other reference signal TXOs of other transmitter groups. The operations of 2105 may be performed according to the methods described herein. In certain examples, aspects of the operations of 2105 may be performed by a transmitter group identification component as described with reference to FIGS. 10 through 13.

At 2110 the UE 115 may determine a reference signal sequence for a reference signal to be transmitted in the first reference signal TXO. The operations of 2110 may be performed according to the methods described herein. In certain examples, aspects of the operations of 2110 may be performed by a reference signal sequence generator as described with reference to FIGS. 10 through 13.

At 2115 the UE 115 may select an OCC to be applied to the reference signal sequence, wherein the OCC is selected from a set of available OCCs that includes non-binary OCCs. The operations of 2115 may be performed according to the methods described herein. In certain examples, aspects of the operations of 2115 may be performed by a OCC manager as described with reference to FIGS. 10 through 13.

At 2120 the UE 115 may apply the selected OCC to the reference signal sequence to obtain the reference signal. The operations of 2120 may be performed according to the methods described herein. In certain examples, aspects of the operations of 2120 may be performed by a OCC manager as described with reference to FIGS. 10 through 13.

At 2125 the UE 115 may transmit a portion of a first data transmission after the first reference signal TXO and concurrently with a second reference signal TXO of a second transmitter group of the plurality of transmitter groups. The operations of 2125 may be performed according to the methods described herein. In certain examples, aspects of the operations of 2125 may be performed by a data transmission manager as described with reference to FIGS. 10 through 13.

At 2130 the UE 115 may determine that a portion of a second data transmission is to be transmitted during the first reference signal TXO. The operations of 2130 may be performed according to the methods described herein. In certain examples, aspects of the operations of 2130 may be performed by a data transmission manager as described with reference to FIGS. 10 through 13.

At 2135 the UE 115 may interlace the portion of the second data transmission with the reference signal. The operations of 2135 may be performed according to the methods described herein. In certain examples, aspects of the operations of 2135 may be performed by a data transmission manager as described with reference to FIGS. 10 through 13.

At 2140 the UE 115 may transmit the portion of the second data transmission interlaced with the reference signal during the first reference signal TXO. The operations of 2140 may be performed according to the methods described herein. In certain examples, aspects of the operations of 2140 may be performed by a data transmission manager as described with reference to FIGS. 10 through 13.

Figure 22:
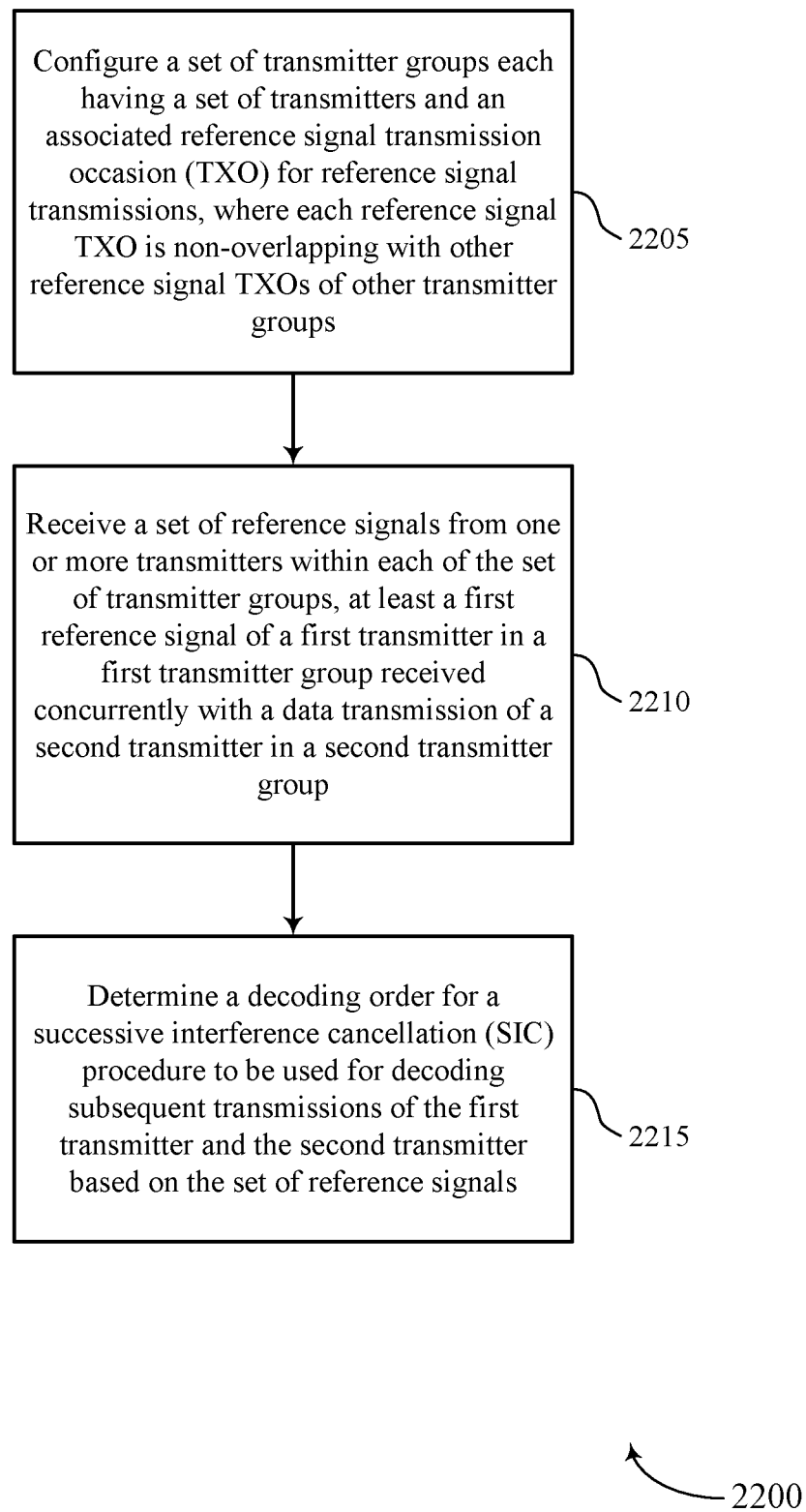

FIG. 22 shows a flowchart illustrating a method 2200 for reference signal transmission in wireless communications in accordance with aspects of the present disclosure. The operations of method 2200 may be implemented by a base station 105 or its components as described herein. For example, the operations of method 2200 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may configure a plurality of transmitter groups each having a plurality of transmitters and an associated reference signal TXO for reference signal transmissions, wherein each reference signal TXO is non-overlapping with other reference signal TXOs of other transmitter groups. The operations of 2205 may be performed according to the methods described herein. In certain examples, aspects of the operations of 2205 may be performed by a transmitter group identification component as described with reference to FIGS. 14 through 17.

At 2210 the base station 105 may receive a plurality of reference signals from one or more transmitters within each of the plurality of transmitter groups, at least a first reference signal of a first transmitter in a first transmitter group received concurrently with a data transmission of a second transmitter in a second transmitter group. The operations of 2210 may be performed according to the methods described herein. In certain examples, aspects of the operations of 2210 may be performed by a reference signal receiver as described with reference to FIGS. 14 through 17.

At 2215 the base station 105 may determine a decoding order for a SIC procedure to be used for decoding subsequent transmissions of the first transmitter and the second transmitter based at least in part on the plurality of reference signals. The operations of 2215 may be performed according to the methods described herein. In certain examples, aspects of the operations of 2215 may be performed by a SIC manager as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first transmitter group from a plurality of transmitter groups and a first reference signal transmission occasion (TXO) for a reference signal transmission, wherein each transmitter group of the plurality of transmitter groups has an associated reference signal TXO that is non-overlapping with other reference signal TXOs of other transmitter groups;
   determining a reference signal sequence for a reference signal to be transmitted in the first reference signal TXO;
   selecting an orthogonal cover code (OCC) to be applied to the reference signal sequence, wherein the OCC is selected from a set of available OCCs that includes non-binary OCCs;
   applying the selected OCC to the reference signal sequence to obtain the reference signal; and
   transmitting the reference signal during the first reference signal TXO.

2. The method of claim 1, further comprising:
   determining that the first TXO follows a second reference signal TXO of a second transmitter group of the plurality of transmitter groups within a transmission time interval (TTI); and
   entering a discontinuous transmission (DTX) mode for a portion of the TTI until a start of the first reference signal TXO.

3. The method of claim 2, further comprising:
   determining that a third transmitter group of the plurality of transmitter groups has a third reference signal TXO that starts after the second TXO within the TTI; and
   transmitting a data transmission concurrently with one or more reference signal transmissions of one or more transmitters of the third transmitter group.

4. The method of claim 3, wherein one or more resource elements (REs) for the data transmission are selected to be different than reference signal REs of the one or more reference signal transmissions of the one or more transmitters of the third transmitter group.

5. The method of claim 1, further comprising:
   transmitting, after transmitting the reference signal, one or more data transmissions, and wherein a first transmit power used for the reference signal is different than a second transmit power used for the one or more data transmissions.

6. The method of claim 1, wherein the reference signal sequence is determined independently of the reference signal TXO.

7. The method of claim 1, wherein the reference signal TXO comprises one or more orthogonal frequency division multiplexing (OFDM) symbols.

8. The method of claim 7, wherein the first reference signal TXO is directly adjacent to one or more other reference signal TXOs of one or more other of the plurality of transmitter groups, or one or more OFDM symbols separate the first reference signal TXO and a prior or subsequent reference signal TXO of one or more other of the plurality of transmitter groups.

9. The method of claim 7, wherein reference signal TXO resources are dynamically configured via a physical downlink control channel (PDCCH) transmission from a base station, or are semi-statically configured via radio resource control (RRC) signaling from the base station.

10. The method of claim 1, further comprising:
    determining one or more data transmissions that are to be transmitted during the first reference signal TXO;
    interlacing the one or more data transmissions with the reference signal; and
    transmitting the one or more data transmissions interlaced with the reference signal during the first reference signal TXO, wherein the reference signal is transmitted using a same transmit power as the one or more data transmissions.

11. The method of claim 1, wherein the selecting comprises selecting a binary OCC or a non-binary OCC based at least in part on an overloading factor of non-orthogonal multiple access (NOMA) transmissions, a system bandwidth, a time span of the first reference signal TXO, or any combination thereof.

12. The method of claim 1, wherein the non-binary OCCs comprise a constant amplitude zero autocorrelation (CAZAC) waveform, a discrete Fourier transform (DFT) sequence, or a computer generated sequence (CGS) with a low peak to average power ratio (PAPR).

13. The method of claim 1, further comprising:
    transmitting a first data transmission prior to the first reference signal TXO and concurrently with a second reference signal TXO of a second transmitter group of the plurality of transmitter groups.

14. The method of claim 13, wherein one or more resource elements (REs) used for the first data transmission are different than REs used for reference signal transmissions by one or more transmitters of the second transmitter group during the second reference signal TXO.

15. The method of claim 13, wherein a first transmit power used for the first data transmission prior to the first reference signal TXO is different than a second transmit power used for the reference signal transmission during the first reference signal TXO.

16. The method of claim 1, further comprising:
    transmitting a portion of a first data transmission after the first reference signal TXO and concurrently with a second reference signal TXO of a second transmitter group of the plurality of transmitter groups;
    determining that a portion of a second data transmission is to be transmitted during the first reference signal TXO;

interlacing the portion of the second data transmission with the reference signal; and transmitting the portion of the second data transmission interlaced with the reference signal during the first reference signal TXO.

17. The method of claim 16, wherein the reference signal of the first transmitter group is transmitted using a same transmit power as the first data transmission of the first transmitter group on the first reference signal TXO, and wherein the first data transmission is transmitted using a different transmit power than the reference signal when the first data transmission is not transmitted on the first reference signal TXO, and wherein the transmit power of the reference signal and the first data transmission are different from the transmit power of the second reference signal TXO and the second data transmission.

18. A method for wireless communication, comprising:
configuring a plurality of transmitter groups each having a plurality of transmitters and an associated reference signal transmission occasion (TXO) for reference signal transmissions, wherein each reference signal TXO is non-overlapping with other reference signal TXOs of other transmitter groups;

receiving a plurality of reference signals from one or more transmitters within each of the plurality of transmitter groups, at least a first reference signal of a first transmitter in a first transmitter group received concurrently with a data transmission of a second transmitter in a second transmitter group; and determining a decoding order for a successive interference cancellation (SIC) procedure to be used for decoding subsequent transmissions of the first transmitter and the second transmitter based at least in part on the plurality of reference signals.

19. The method of claim 18, wherein the decoding order is based at least in part on an order in which the plurality of transmitter groups transmit reference signals, a power of the reference signal transmissions, a channel quality associated with each transmitter group of the plurality of transmitter groups, or any combination thereof.

20. The method of claim 18, wherein the configuring comprises configuring each transmitter group with TXO resources and an orthogonal cover code (OCC) to be applied to the reference signal transmissions, the OCC selected from a set of available OCCs that includes non-binary OCCs.

21. The method of claim 20, wherein the non-binary OCCs comprise a constant amplitude zero autocorrelation (CAZAC) waveform, a discrete Fourier transform (DFT) sequence, or a computer generated sequence (CGS).

22. The method of claim 18, wherein each reference signal TXO comprises one or more orthogonal frequency division multiplexing (OFDM) symbols.

23. The method of claim 22, wherein a first reference signal TXO of the first transmitter group is directly adjacent to one or more other reference signal TXOs of one or more other of the plurality of transmitter groups, or one or more OFDM symbols separate the first reference signal TXO and a prior or subsequent reference signal TXO of one or more other of the plurality of transmitter groups.

24. The method of claim 22, wherein reference signal TXO resources are dynamically configured via a physical downlink control channel (PDCCH) transmission, or are semi-statically configured via radio resource control (RRC) signaling.

25. The method of claim 18, wherein the configuring comprises configuring transmitters of each transmitter group to enter a discontinuous transmission (DTX) mode for a portion of a transmission time interval (TTI) until a start of the reference signal TXO associated with the respective transmitter group.

26. The method of claim 18, wherein the configuring comprises configuring one or more data transmissions to be transmitted during the reference signal TXO through interlacing the one or more data transmissions with the reference signal transmissions within the reference signal TXO.

27. The method of claim 18, wherein the configuring comprises configuring transmitters of one or more of the plurality of transmitter groups to transmit the data transmission prior to a corresponding reference signal TXO and concurrently with a reference signal TXO of another transmitter group of the plurality of transmitter groups.

28. The method of claim 18, wherein the configuring comprises configuring transmitters of the plurality of transmitter groups to interlace a portion of data transmissions with reference signal transmissions within their respective reference signal TXOs, and configuring at least the first transmitter group to time division multiplex a corresponding first reference signal TXO with other data transmissions of the first transmitter group.

29. An apparatus for wireless communication, comprising:
a processor;
memory in electronic communication with the processor; and
instructions stored in the memory and executable by the processor to cause the apparatus to:
identify a first transmitter group from a plurality of transmitter groups and a first reference signal transmission occasion (TXO) for a reference signal transmission, wherein each transmitter group of the plurality of transmitter groups has an associated reference signal TXO that is non-overlapping with other reference signal TXOs of other transmitter groups;
determine a reference signal sequence for a reference signal to be transmitted in the first reference signal TXO;
select an orthogonal cover code (OCC) to be applied to the reference signal sequence, wherein the OCC is selected from a set of available OCCs that includes non-binary OCCs;
apply the selected OCC to the reference signal sequence to obtain the reference signal; and
transmit the reference signal during the first reference signal TXO.

30. An apparatus for wireless communication, comprising:
a processor;
memory in electronic communication with the processor; and
instructions stored in the memory and executable by the processor to cause the apparatus to:
configure a plurality of transmitter groups each having a plurality of transmitters and an associated reference signal transmission occasion (TXO) for reference signal transmissions, wherein each reference signal TXO is non-overlapping with other reference signal TXOs of other transmitter groups;
receive a plurality of reference signals from one or more transmitters within each of the plurality of transmitter groups, at least a first reference signal of a first transmitter in a first transmitter group received concurrently with a data transmission of a second transmitter in a second transmitter group; and determine a decoding order for a successive interference cancellation (SIC) procedure to be used for decoding subsequent transmissions of the first transmitter and the second transmitter based at least in part on the plurality of reference signals.

\* \* \* \* \*